United States Patent [19]
Thirion De Briel et al.

[11] Patent Number: 5,452,783
[45] Date of Patent: Sep. 26, 1995

[54] LINER SUPPORT DISC, ESPECIALLY FOR A MOTOR VEHICLE CLUTCH

[75] Inventors: Jacques Thirion De Briel, Colombes; André Dalbiez, Argenteuil, both of France

[73] Assignee: Valeo, Paris, France

[21] Appl. No.: 91,060

[22] Filed: Jul. 14, 1993

[30] Foreign Application Priority Data

Jul. 15, 1992 [FR] France ................... 92 08710
Mar. 19, 1993 [FR] France ................... 93 03193
Jun. 21, 1993 [FR] France ................... 93 07475

[51] Int. Cl.⁶ ........................................ F16D 13/64
[52] U.S. Cl. ........................ 192/107 C; 192/70.14; 188/73.2
[58] Field of Search ............... 192/107 C, 107 R, 192/70.14; 188/73.1, 73.2

[56] References Cited

U.S. PATENT DOCUMENTS

| | | | |
|---|---|---|---|
| 2,477,016 | 7/1949 | Thelander | 192/107 C |
| 2,587,837 | 3/1952 | Goodwin | 192/107 C |
| 4,714,148 | 12/1987 | Alas et al. | 192/107 C |
| 4,993,531 | 2/1991 | Villata | 192/107 C |

FOREIGN PATENT DOCUMENTS

| | | | |
|---|---|---|---|
| 0285300 | 10/1988 | European Pat. Off. | |
| 1067727 | 6/1954 | France | 192/107 C |
| 1387565 | 3/1964 | France | |
| 2094693 | 2/1972 | France | |
| 2565305 | 12/1985 | France | |
| 2751043 | 5/1978 | Germany | 192/107 C |
| 3041102 | 6/1982 | Germany | 188/73.1 |

*Primary Examiner*—Andrea L. Pitts
*Attorney, Agent, or Firm*—Longacre & White

[57] ABSTRACT

A friction clutch, especially for a motor vehicle, has a clutch friction wheel which includes a liner support disc having a central portion and a peripheral portion which is divided into blades, with friction liners being carried on both sides of the support disc and secured to these blades. At least some of the blades of the liner support disc are of tripod type, having at least one central support surface zone and two peripheral support surface zones. The central zone is connected firstly to the central portion of the support disc through a tangential fold, and secondly to the peripheral zones of the blade through oblique folds.

29 Claims, 16 Drawing Sheets

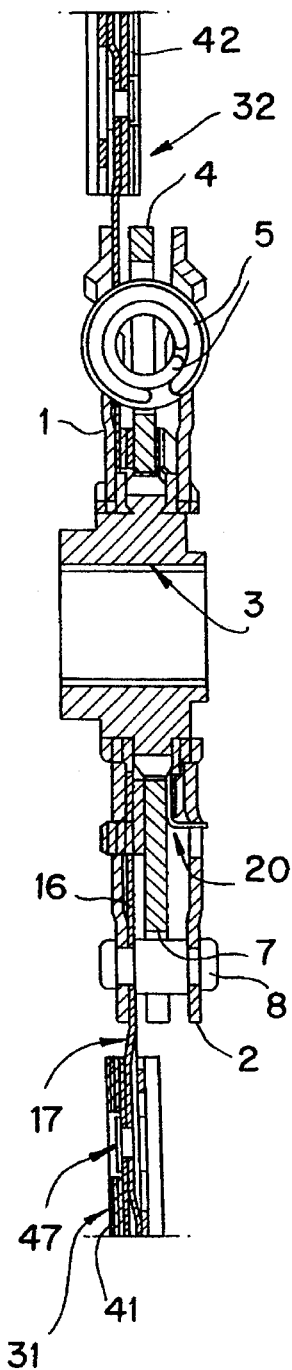
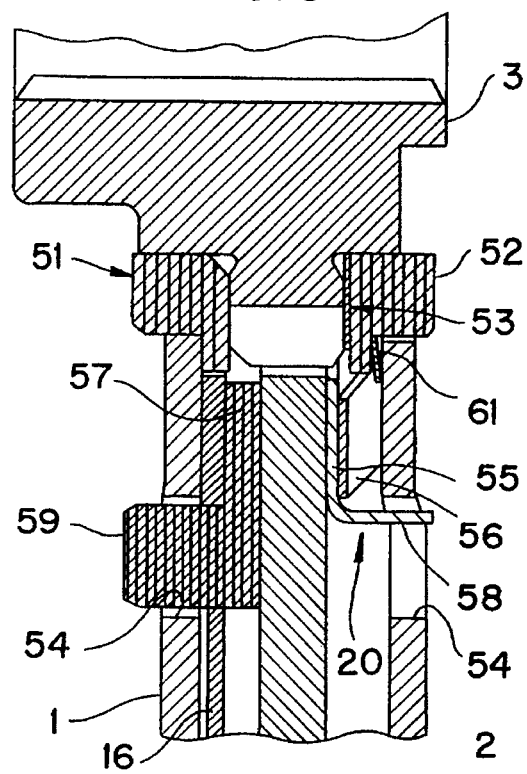
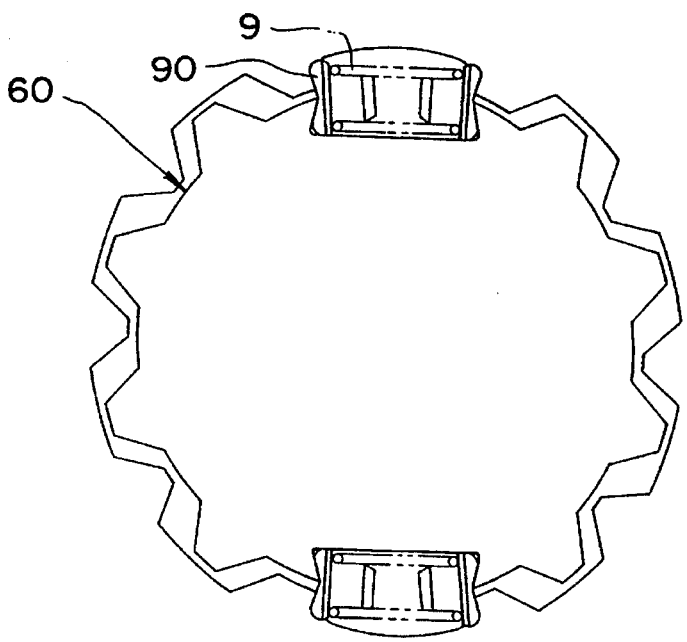

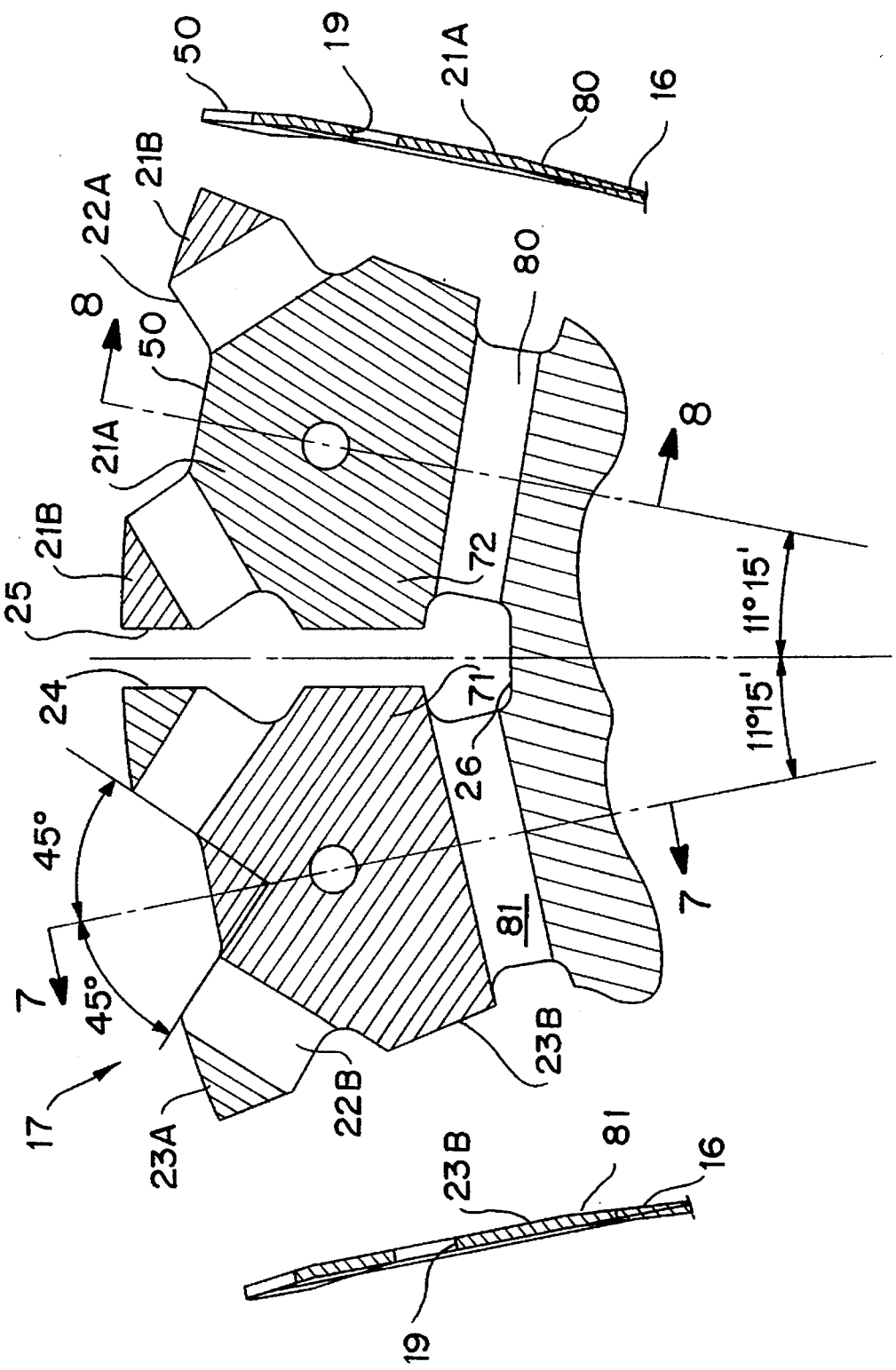

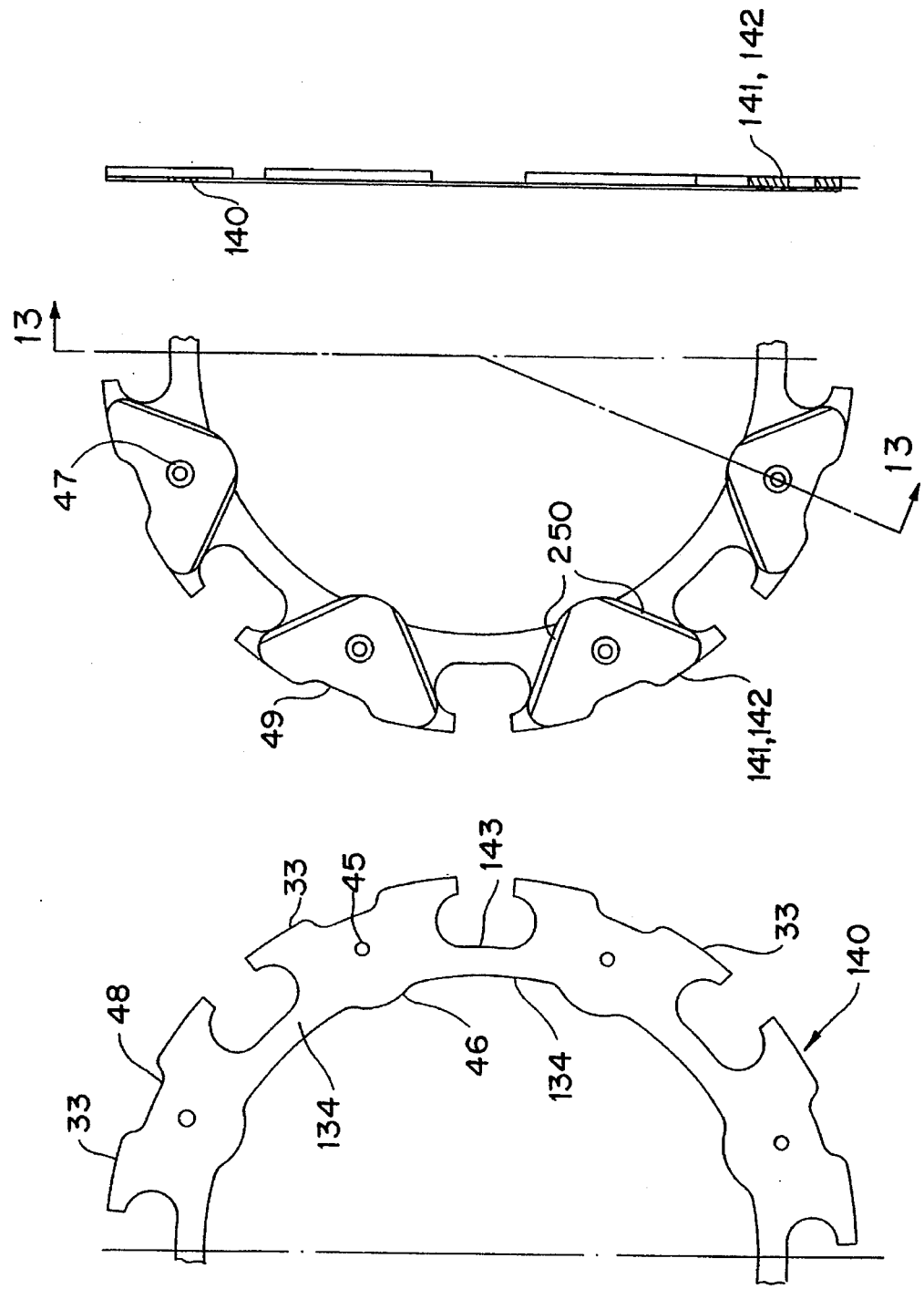

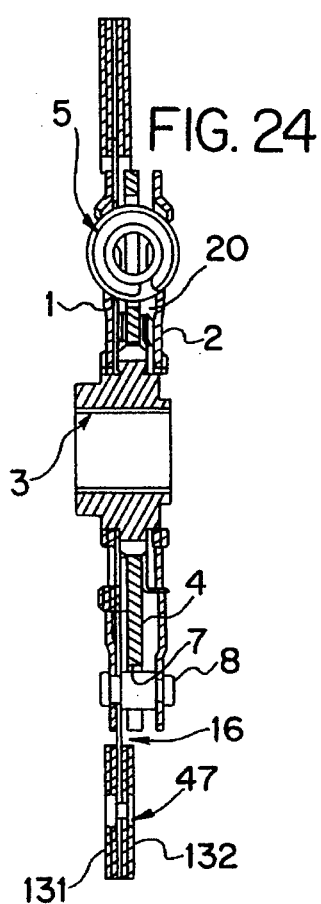
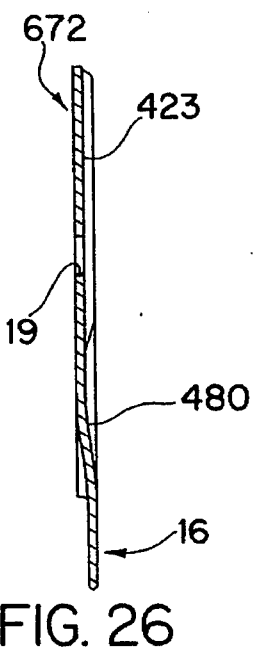
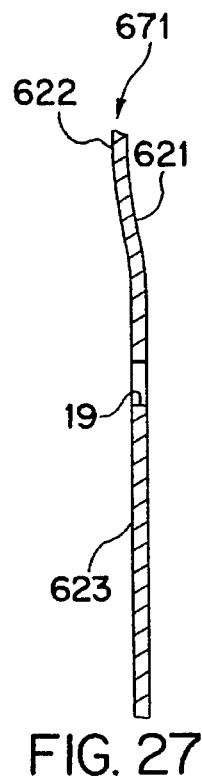
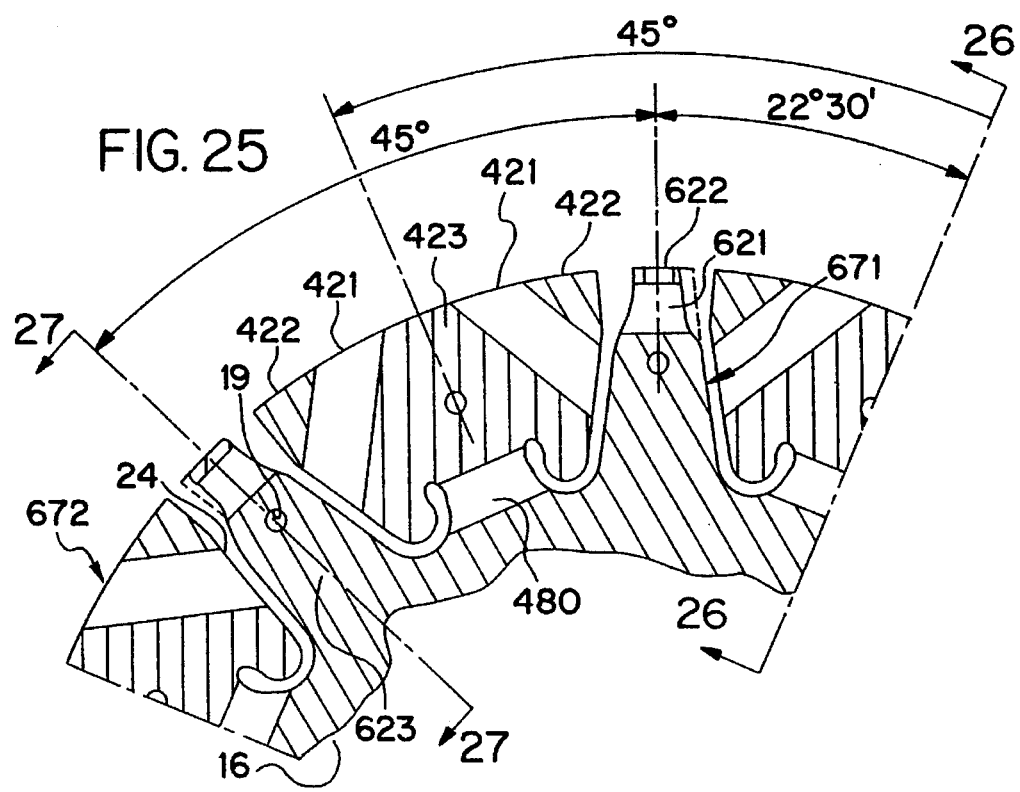

LINER SUPPORT DISC, ESPECIALLY FOR A MOTOR VEHICLE CLUTCH

FIELD OF THE INVENTION

This invention relates to a liner support disc for a clutch friction wheel, especially for a motor vehicle, the support disc being of the kind comprising a central portion and a peripheral portion divided into radial blades, which are adapted to receive friction liners, with each said blade being joined to the said central portion of the support disc through a foot and having at least one support surface zone which are generally parallel to the midplane of the said central portion. The support surface zone with and is secured to at least one of the said friction liners. In the clutch friction wheel, the friction liners are arranged on either side of the peripheral portion of the liner support disc.

BACKGROUND OF THE INVENTION

As is well known, a clutch friction wheel or clutch plate, and the various components which are fixed to it, are sometimes subjected in operation to disagreeable vibrations, constituting what is often called judder. This judder effect is just as likely to occur at low torques, such as during a parking maneuver, as it is at high torques such as during a gear change while travelling or during a hill start.

The support surface zones of the liner support disc sometimes have a larger surface area than is required, and this gives rise to a phenomenon of interference, sometimes called embedding, in which the friction liners become embedded in the hollows that exist between two support surfaces of one blade of the support disc. This reduces flexibility, which is at least partly responsible for judder effects at maximum load. This lack of flexibility can occur very suddenly.

In order to overcome this drawback, it has been proposed in the specification of French published patent application FR 2 094 693A to increase as far as possible the number of support surfaces provided by each of the blades, and also to increase the number of the blades themselves. The drawings of that document show the blades as having an asymmetrical shape, these blades being formed with cut-out portions. As a result, the blades do not have as great a resistance to centrifugal force as might be desired.

In addition, there is a problem of contact with the pressure plate of the clutch. In each operation of engaging the clutch, the friction liners become progressively gripped between the pressure plate and the reaction plate of the clutch. During this operation considerable frictional forces are set up, which give rise to heating. This heating leads inevitably to a gradual deformation of the pressure plate into a conical shape, as is explained for example in U.S. Pat. No. 2,902,130. The same effect is also observed in the reaction plate, though not to such a marked extent.

As a result, the zone in which the friction liners are subjected to the pressure between the liners and the plates of the clutch gradually shifts radially inwards, i.e. towards the axis of the assembly. This causes unequal wear of the friction liners to occur, and also reduces their efficiency by reducing the torque which is transmitted. It may also give rise to judder effects.

In general terms, and especially in the interests of standardisation, it is desirable that the liner support disc should be suitable not only for friction liners of the organic type, but also for those of other types.

DISCUSSION OF THE INVENTION

An object of the present invention is to overcome, in a simple and inexpensive way, the disadvantages mentioned above. With this in view, the invention aims to provide a new type of standard liner support disc which is capable of rotating at increased speeds while being less subject to embedding and judder effects, and being capable of adapting easily to a conical shape.

According to the invention, a liner support disc for a clutch friction wheel, especially for a motor vehicle, the support disc being of the kind comprising a central portion and a peripheral portion divided into radial blades, which are adapted to receive friction liners, with each said blade being joined to the said central portion of the support disc through a foot and having at least one support surface zone which are generally parallel to the midplane of the said central portion, for contact with at least one of the said friction liners and so as to be secured to the latter, is characterised in that at least some of the said blades are of a tripod type having a central support surface zone, together with two peripheral support surface zones disposed on either side of the said central zone, and in that the said central support surface zone is offset axially with respect to the said peripheral support surface zones and with respect to the said central portion of the liner support disc, and is connected, firstly, to the central portion of the liner support disc through a tangential fold which is at right angles to the radial axis of symmetry of the said blade, and secondly, to the said peripheral zones through folds, which are oblique with respect to the radial axis of symmetry of the said blade.

Thanks to the invention, it is possible to increase the surface area of the support surfaces of the blades of the support disc, as well as the number of blades. The central support surface zone of each blade has a very large circumferential width, so that the feet of the blades also have a very large width and are very strong.

Thus, it is possible to have contact surfaces greater than 25% of the total surface of the back of an annular liner, while the distance between two consecutive central support surface zones is decreased. The invention provides blades of the tripod type. With the arrangements according to the invention, embedding effects, in particular when friction liners of the organic type are used as in the French patent specification FR 2 094 693A referred to above, are used, are reduced. In addition, the blade can rotate at higher speeds, being more resistant to centrifugal force than before. Judder effects are also reduced. The liner support disc has a very long useful life, and wear of the friction liners is reduced. Furthermore, manufacture of the blades is simplified, because it is not necessary to provide any cut out portion in the central part of the blade.

In addition, due to the configuration of the blade, the latter is able to adapt to the gradual deformation of the pressure plate to a conical shape, and the pressures involved in operation are well distributed.

The peripheral zones of each tripod blade flank the central zone, and the tangential folds are part of the feet of the blades. Their central zones become narrower towards the outer periphery, and have a surface area which is larger than that of the peripheral surface zones.

Because of the folds which provide axial offsets, good stability of the blades is obtained, and good parallelism between the friction liners and, for example, the pressure plate. All this leads to good progressive axial movement during engagement of the clutch. In addition, in design, it is possible to vary the flexibility of the blades by making suitable adjustments to the width and length of the various folds.

It will be appreciated that, in the circumferential direction, the tangential folds have a large width, which makes the blade very robust. For example, these blades may be distributed in two groups, with the blades of each group alternating with those of the other group, and it is possible to provide different flexibility between the blades of one group and those of another, by suitable choice of, for example, the lengths of the tangential folds.

Thus those blades which are intended to make contact with the pressure plate, through the friction liner or liners, may have tangential folds which are longer than those of those blades which are intended to make contact with the reaction plate through the liner or liners. This is due to the fact that the tendency of the pressure plate to deform to a conical shape is more pronounced than the reaction plate.

The oblique folds, which extend to the outer periphery of the blades (these folds being referred to for convenience as peripheral folds), make it possible to obtain the required progressive axial movement during engagement of the clutch. In this connection, by increasing the length, i.e. the distance between the support surface zones, of these folds, the flexibility of the peripheral zones is increased.

In a modified embodiment of liner support disc according to the invention, a series of blades associated with the reaction plate may consist of radial tongues which lie in the same plane as the central portion of the support disc. With this arrangement it is possible to increase the circumferential length of the tripod blades, and therefore to increase the surface area of the support surfaces of the blades, so as to achieve contact surfaces which constitute more than 30% of the total surface area of the back of the annular friction liner.

It is also possible to increase the peripheral support surface zones by reducing the radial height of the above mentioned tongues.

The invention thus has very wide application, and enables the stiffness of the blades to be well regulated. It enables friction liners of the organic type to be used, and also friction liners consisting of plural pads.

In those versions in which the tripod blades are arranged alternately in the circumferential direction with tongues in the manner mentioned above, when the friction liners are progressively gripped elastically between the pressure plate and reaction plate of the clutch, the friction liner associated with the pressure plate (which liner may be divided into separate liner elements) is well supported, because it finds a reaction on another friction liner through its peripheral support surface zones.

The same is not true for the other friction liner, i.e. the one carried by the tongues. This liner may again be divided into separate friction elements. In this case, those zones of the liner which are in facing relationship to the tongues become worn to a lesser extent than in a case where wear of the liner is not well supported.

According to a preferred feature of the invention, each of at least some of the said tongues has at its free end a supplementary support surface zone carried by a junction fold whereby the said zone is offset axially towards the central zones of the blades. With this arrangement, during the elastic compression of the friction liners, the one which is associated with the tongues finds a reaction surface which is provided by this new, supplementary, support surface zone, which is arranged to bear against the other friction liner. This leads to a reduction in embedding phenomena, since wear of the liner carried by the tongues is better distributed.

In addition, wear is reduced in the liner associated with the tripod blades, because for this liner, the support surface zone of the tongues provides a supplementary engagement surface. Thus wear in the other liner is more regular.

According to another preferred feature of the invention, the tongues have free ends which are of reduced circumferential width. This enables the support surface zones of the tongues to be made very supple, while making it possible to increase the circumferential width of the peripheral support surface zones of the tripod blades.

According to yet another preferred feature of the invention, the liner support disc is characterised in that the said tongues have a slender form toward their outer periphery, such that the root zone joining each tongue to the said central portion of the liner support disc is increased, which enhances the robustness of the support disc. This also enables the stiffness of the support surface zone of the tongue to be reduced.

For clutch friction wheels of large size (i.e. large diameter), or when the friction liners are thin, being adhesively secured on thin metal backing plates secured by riveting on to the liner support disc, the principle of using at least one series of tripod blades is not altered. However, under these circumstances it is necessary to accommodate least rows of rivets, fitted on pitch circles of different diameters providing holes for the increased number of fasteners in the central zones of the tripod blades. This is because it is necessary to space the rivet holes apart by a substantial radial distance in order to secure the friction liners properly.

The central zone of a tripod blade is connected to the central portion of the liner support disc through a foot element including at least one inclined zone in the form of a longitudinal or tangential fold at right angles to the radial axis of symmetry of the tripod blade. According to another preferred feature of the invention, in such an arrangement, the said central zone in each of at least some of the tripod blades has a central extension projecting radially inwardly and defined by a slit formed in the said longitudinal fold, and each said extension is formed with an additional hole for receiving another fastener for the friction liner. Thanks to this provision it is possible to provide at least two holes in the same plane, spaced radially away from each other in the central zone of a tripod blade, for receiving respective fasteners.

It is thus possible to secure the friction liner (whether or not it is divided up into friction pads) to the central zones of the first series of tripod blades by means of at least two sets of rivets or other suitable fasteners, spaced radially away from each other. Sound fastening of the friction liner is thus obtained enabling the liner to rotate at very high speeds.

It will be appreciated that this embodiment is inexpensive, because it does not call for any significant modification to the tooling required for making the liner support disc. In this connection, it is merely sufficient to make a slit, using a simple tool, and to form two rows of fastener holes. In addition, the extension to the central zone, in each blade having a second fastener hole, increases the surface area for support of the associated friction liner, without any prejudice to the mechanical strength of the longitudinal fold.

According to yet another preferred feature of the invention, in order to preserve the maximum contact surface area for the friction liner with the smallest possible distances between the support surfaces, the number of blades can be increased. A result of this is that these blades then have a reduced circumferential width. It then becomes possible to conform the above mentioned tongues, which lie generally in the same plane as the central portion of the liner support disc, in the form of further tripod blades having a central zone in the same plane as the central portion of the support disc, together with two peripheral support surface zones on either side of the central zone.

Then, during the elastic compression of the friction liners during engagement of the clutch, the liner which is associated with these tongues finds a reaction surface in the new peripheral support surface zones which are arranged to come into abutment against the oppositely facing friction liner.

Embedding effects are also reduced, and wear is better distributed in the friction liner associated with the tongues. In addition, wear is reduced in the friction liner associated with the first series of blades, because the peripheral support surface zones of the tongues provide a supplementary bearing surface. Wear is also distributed more evenly to the opposite friction liner.

It is of course possible to replace the above mentioned tongues with a second series of tripod blades.

According to yet another preferred feature of the invention, in each blade having the above mentioned slit, the slit extends locally into the central zone of the tripod blade so as to reduce the chance of any fracture in the region of the said extension.

Further features and advantages of the invention will appear more clearly on a reading of the detailed description of preferred embodiments of the invention which follows, and which is given by way of no-limiting example only and with reference to the accompanying drawings.

BRIEF DESCRIPTION OF THE DRAWINGS

FIG. 2 is a view in cross section taken on the line 2—2 in FIG. 1.

FIG. 3 repeats part of the lower half of FIG. 2, on a larger scale and in greater detail.

FIG. 4 is a diagrammatic view of the loose coupling means which act between the hub and the hub plate of the clutch friction wheel.

FIG. 6 repeats, on a larger scale, that part of

FIG. 5 within the box indicated at 6 in FIG. 5.

FIG. 7 is a view in cross section taken on the line 7—7 in FIG. 6.

FIG. 8 is a view in cross section taken on the line 8—8 in FIG. 6.

FIG. 11 is a half view showing a support crown in another embodiment of the invention.

FIG. 12 is a half view of a friction liner having the support crown shown in FIG. 11.

FIG. 13 is a view in cross section taken on the line 13—13 in FIG. 12.

FIG. 24 is a view in axial cross section of a clutch friction wheel similar to that in FIG. 22, but having a liner support disc in yet another embodiment of the invention.

FIG. 25 is a view in elevation showing part of the liner support disc of FIG. 24, on an enlarged scale and with its support surface zones shown hatched.

FIG. 26 is a view in cross section on an even larger scale, taken on the line 26—26 in FIG. 25.

FIG. 27 is a view in cross section on an enlarged scale taken on the line 27—27 in FIG. 25.

Figure 1:
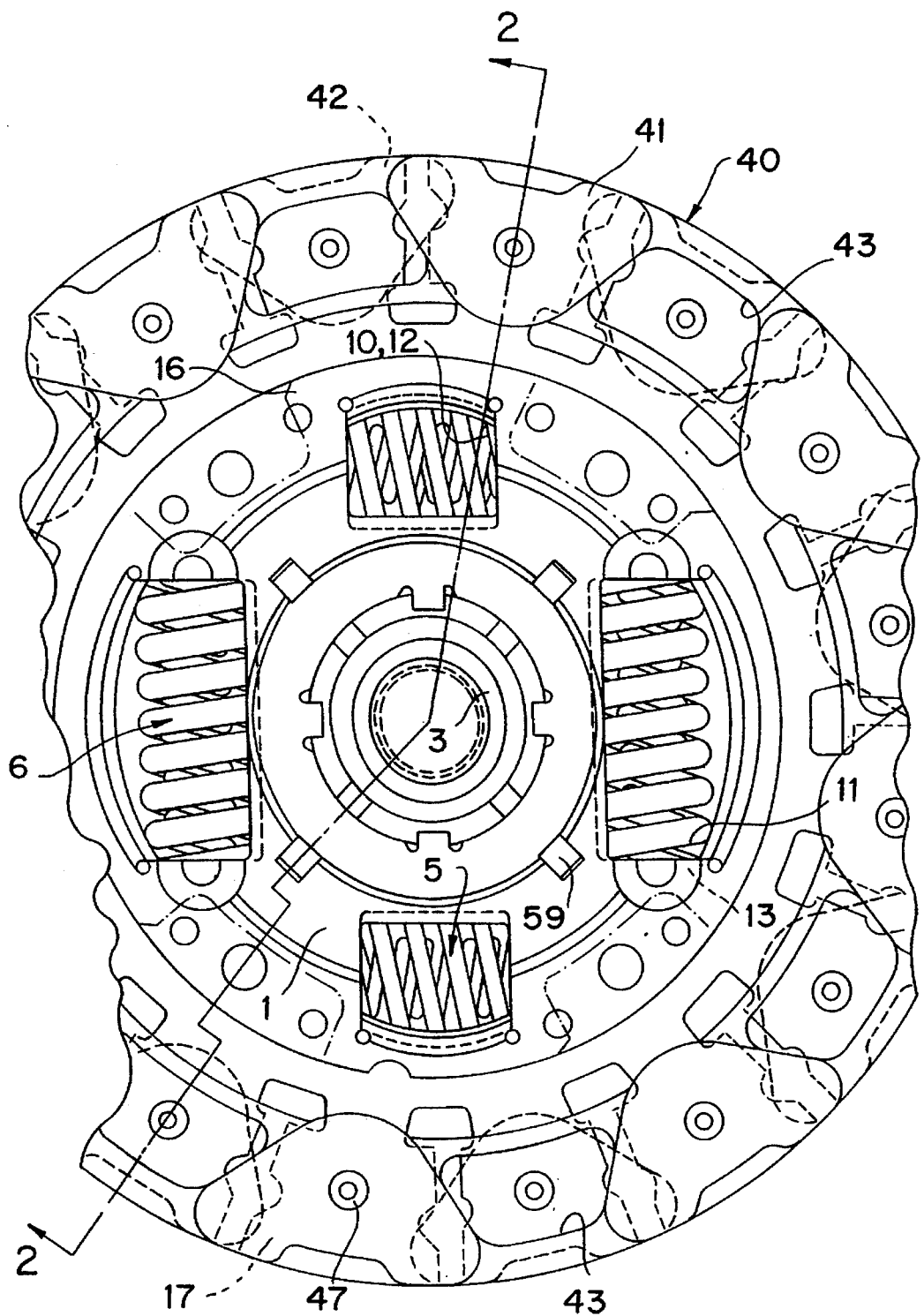
FIG. 1 is a view in elevation of a clutch friction wheel having a liner support disc in accordance with the invention.

DESCRIPTION OF PREFERRED
EMBODIMENTS OF THE INVENTION

Referring first to all of the drawings in general terms, these illustrate a liner support disc which is equipped, with two annular friction liners, this disc being adapted to be part of a clutch friction wheel for a motor vehicle clutch.

The clutch friction wheel itself comprises two coaxial parts which are mounted for relative movement of one with respect to the other against the action of circumferentially acting resilient means 5, 6 and axially acting friction means 20 (see FIGS. 1, 22, 24 and 34). It will be recalled that in such an arrangement, it is usual for one of the two coaxial parts to include two guide rings, together with a liner support disc, while the other coaxial part comprises a generally radial hub plate or damper plate and a hub to which the hub plate is joined integrally, or to which the hub plate, as a separate component, is coupled or secured so as to be rotatable with the hub. In the clutch friction wheel to be described here, the guide rings, 1 and 2, are identical with each other. The liner support disc will be described in detail below. The hub is indicated at 3 and the damper plate at 4. See FIGS. 1, 2, 34 and 35. The damper plate is coupled to the hub either by being secured to it in a rolled joint (not shown), or, as in FIG. 4, through a loose coupling means 60.

Referring to FIG. 4, the loose coupling means 60 comprise teeth of trapezoidal shape which are formed at the outer periphery of the hub 3, together with further teeth, again of trapezoidal shape, which are formed at the inner periphery of the hub plate 4. The two sets of teeth mesh with each other in such a way as to define a circumferential clearance between them. Springs 9 of low stiffness are arranged between the hub 3 and hub plate 4. The ends of each spring 9 engage on insert cups 90 which are mounted in slots formed in the hub 3 and hub plate 4, so as to provide a resilient coupling between the two components 3 and 4. It is of course possible to reverse this construction, with the liner support disc being secured to the hub plate 4 and movable with respect to the hub 3, while the guide rings 1 and 2 are then fixed with respect to the hub 3. Similarly, the liner support disc may be secured to the hub plate 4, with the latter also being secured to the hub 3, the clutch friction wheel then being of the rigid type which can be seen in FIG. 28.

In the drawings, the liner support disc bears on the guide ring 1, to which it is secured by means of specific rivets (not shown) or spacer bars 8 as shown in FIGS. 2, 22, 24 and 34. In a known manner, these spacer bars 8 pass, with a clearance, through apertures 7 which are formed in the hub plate 4, so as to secure the guide rings 1 and 2 together, the latter being arranged on either side (considered in the axial direction) of the hub plate 4.

Figure 34:
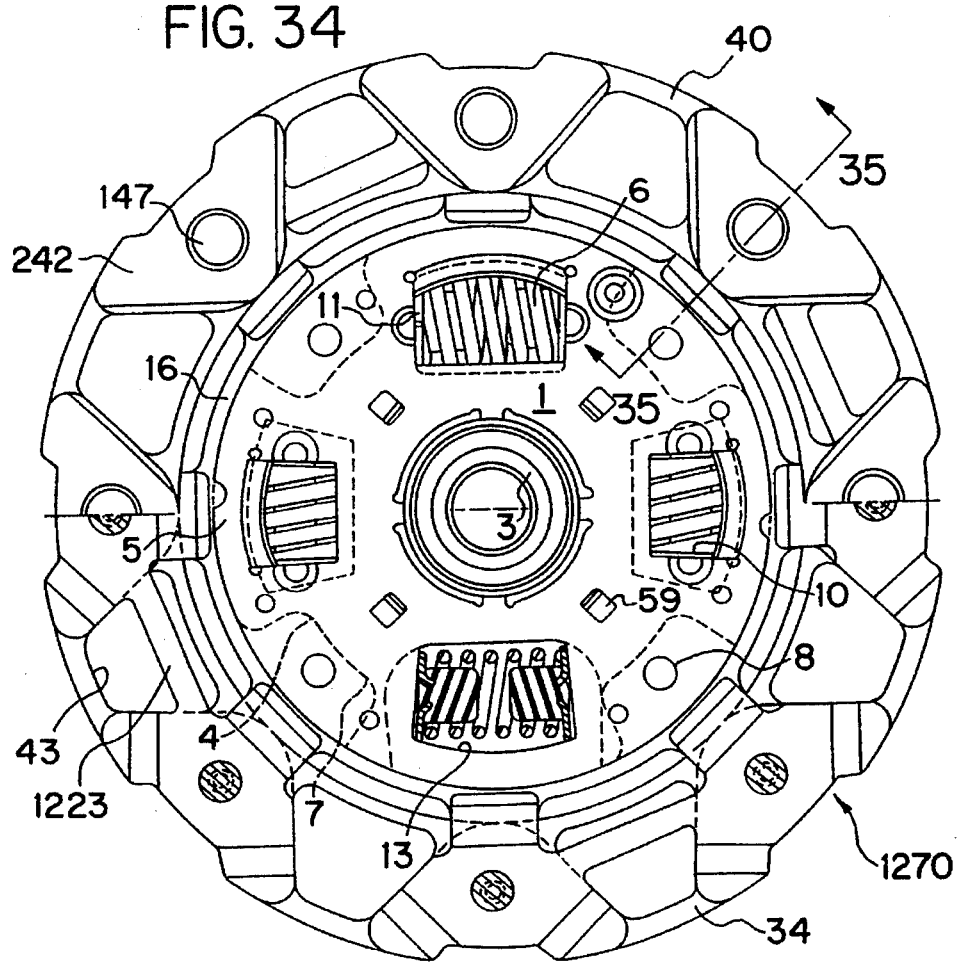
FIG. 34 is a view similar to FIG. 1, showing a still further embodiment of the clutch friction wheel in accordance with the invention.

The above mentioned circumferentially acting resilient means consist of coil springs 5 and 6 which are mounted in pairs in FIG. 1 and singly in FIG. 34. In a modification, at least one of the coil springs may be replaced by an elastomeric block or cushion pad. In general, the springs 5 and 6 are mounted without any clearance in windows 10 and 11, of different lengths, which are formed in the guide rings 1 and 2. The springs 5 are also mounted without any clearance in windows 12 formed in the hub plate 4, while the springs 6 are mounted in further windows 13 formed in the hub plate 4, but in this case with a clearance. The windows 12 and 13 are arranged in facing relationship with the windows 10 and 11 respectively.

The above mentioned friction means 20 comprise, firstly a first friction ring 57 which is disposed between the hub plate 4 and the liner support disc adjacent to the guide ring 1, and secondly, between the hub plate 4 and the guide ring 2, an axially acting spring 56 together with a thrust ring 55. In this example the spring 56 consists of a corrugated ring, though in a modification it may be a Belleville ring. The spring 56 bears on the guide ring 2, and biasses the thrust ring 55 into contact with the hub plate 4 so that the friction ring 57 is gripped. The ring 57 can be centered by means of the spacer bars 8; or alternatively, it may have pins 59 (see FIG. 3), formed on its outer periphery and penetrating into apertures 54 formed in the guide ring 1.

The thrust ring 55 may have a set of axial lugs 58 as shown in FIG. 2, engaging in the apertures 54 so as to couple the thrust ring to the guide ring 2 for rotation together. However, in a modification, the thrust ring 55 may be formed with slotted radial lugs which mesh with the spacer bars 8.

Referring to FIG. 3, L-shaped anti-friction bearings 51 and 52 are interposed between the hub 3 and the guide rings 1 and 2. An intermediate ring 53 and a resilient ring 61 are also provided.

Figure 5:
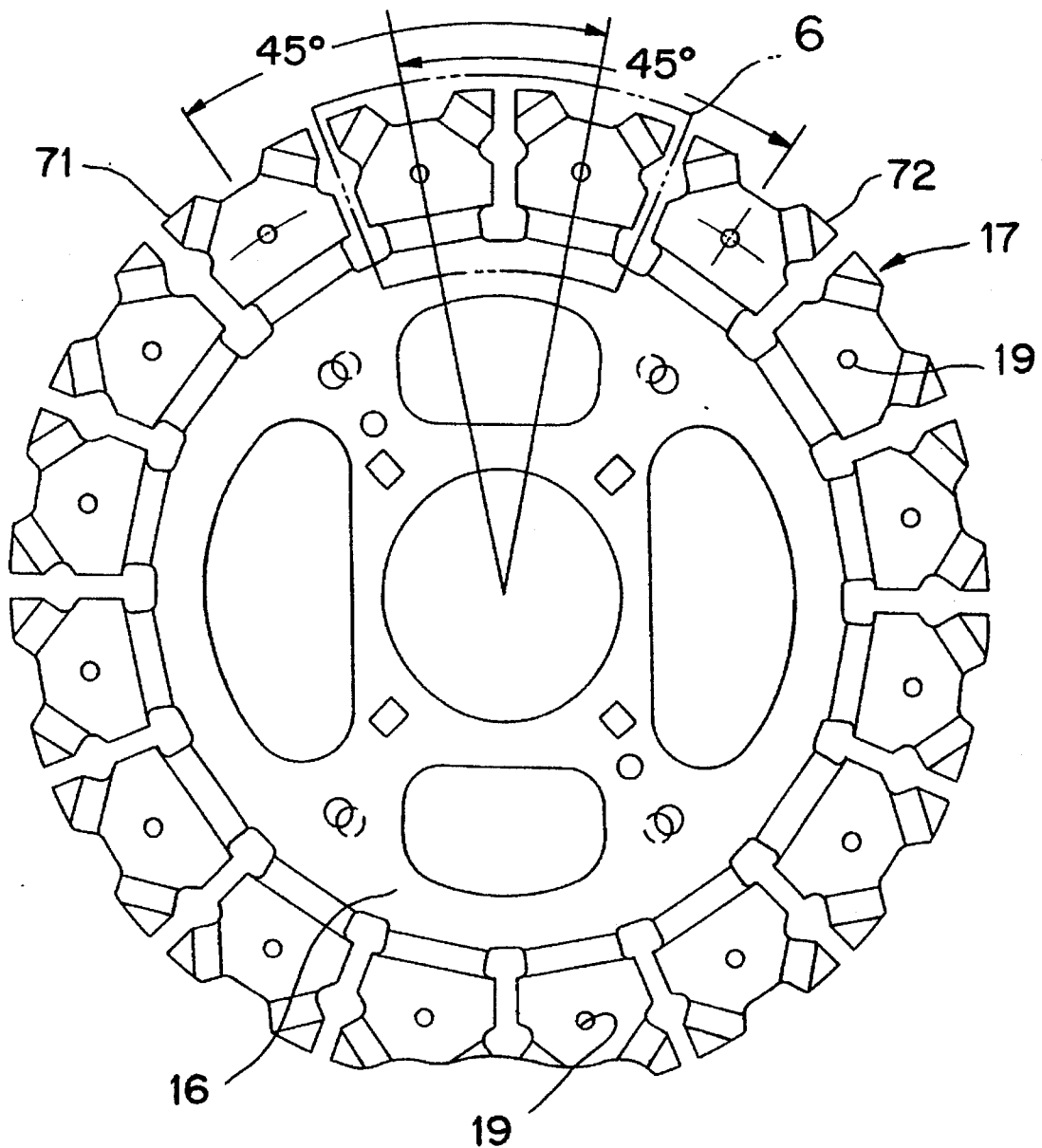
FIG. 5 is a view in elevation showing the greater part of the liner support disc in the embodiment of the invention shown in FIGS. 1 to 4.

The liner support disc comprises, in the usual way, a flat, annular central portion 16. This central portion is formed with various slots and passages, which in the present case accommodate the springs 5 and 6, the lugs 58, pins 59 and spacer bars 9. These various slots and passages are shown in detail in FIG. 5, to which reference is invited.

The liner support disc, besides its central portion 16, has a peripheral portion which is divided into support blades, for example blades 17 in FIG. 1, which are, here, oriented generally radially. These blades will be described later in this document. In FIGS. 1 to 20, and in FIGS. 35 to 38, the liner support disc is equipped with two annular friction liners 31 and 32, mounted back-to-back.

In a clutch, the friction liners are normally gripped between the pressure plate and reaction plate of the clutch (not shown), which are coupled in rotation with the crankshaft of the internal combustion engine of the vehicle. The driving torque is thus transmitted from the pressure plate and reaction plate to the hub 3, which has a splined internal bore for coupling it in rotation with the input shaft of the gearbox of the vehicle. During operation of the clutch, in a first phase the springs 5 become compressed, after which the springs 6 act differentially. In this arrangement the friction means 20 act in a constant manner, with friction of the hub plate 4 in contact with the friction ring 57 and thrust ring 55 of the friction means 20. However, it will of course be understood that there may be only a single stage of these springs.

When the clutch is disengaged, the friction liners 31 and 32 are not in contact with the pressure plate and reaction plate of the clutch. In FIGS. 1 to 10, each friction liner 31, 32 is divided into annular friction pads 41 and 42. These friction pads 41 and 42 can be of a sintered material, or they may be based on carbon fibre or a ceramic material. Each set of pads 41 or 42 is secured to a respective one of two endless, annular support crowns 40. Such a crown is clearly shown in FIG. 9.

Figure 9:
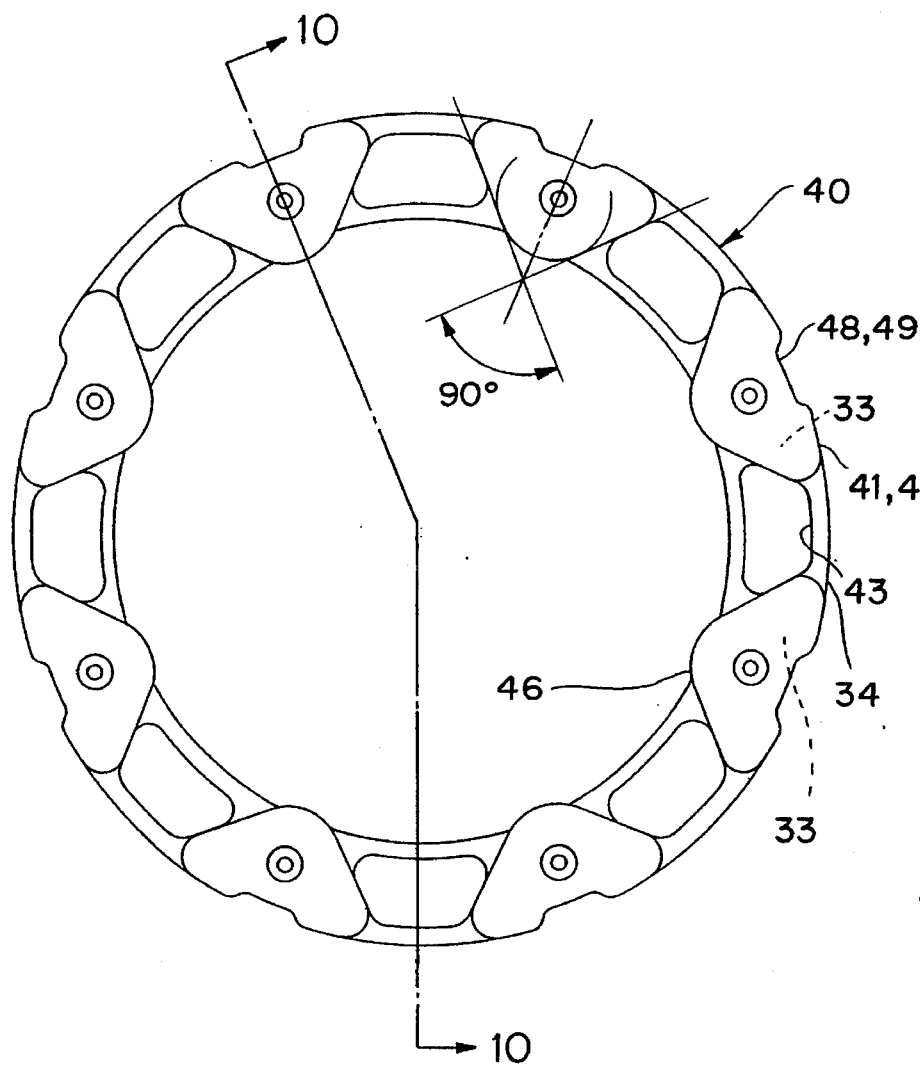
FIG. 9 is a view in elevation showing a friction liner.
Figure 10:
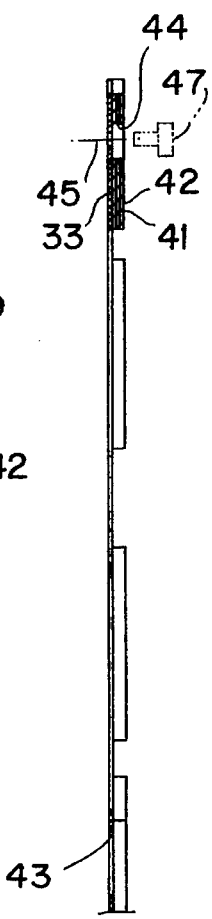
FIG. 10 is a view in cross section taken on the line 10—10 in FIG. 9.

Referring now to FIG. 9, each support crown 40 comprises, in a common radial plane, first sections 33 on which the friction pads 41 and 42 are fixed, and second sections 34 which alternate circumferentially with the sections 33, so that each section 34 joins two consecutive sections 33 together. A circumferentially extending aperture 43 is formed through the middle of each of the second or intermediate sections 34, so as to reduce the mass of the latter. This arrangement gives each friction liner 31 or 32, comprising the respective crown 40 and friction pads 41 or 42, a high degree of flexibility combined with low inertia.

The crown can of course be formed with more than one aperture 43 in each of its sections 34 so as to perforate the latter, but a single weight reducing aperture 43 is preferred for reduction of inertia and enhancement of the elasticity of the crown 40. Each of the first, or pad support, sections 33 of the crown is formed with a tongue 46 which projects radially inwardly with respect to the inner periphery of the intermediate sections 34. In the present example, the crown 40 has eight pad support sections 33, to which are secured eight respective pairs of friction pads 41, 42.

Here, a central hole is formed through each friction pad 41, 42, and through each pad support section 33 of the crown. Each section 33 thus has a through hole 45 (see FIG. 10), while each friction pad 41 or 42 has a fixing hole 44 which is larger than the corresponding hole 45. In this example the holes 44 and 45 are aligned with each other, and a fastener 47 (which in this example is a rivet) is mounted in these holes with its head in a hole 44 and its shank passing through the hole 45 in the crown.

As can be seen in FIG. 1, the friction pads 41 of the liner 31 are offset circumferentially from the pads 42 of the liner 32 by half the circumferential pitch defined between adjacent pads of either one of the friction liners, with each pad being aligned with a respective one of the blades 17 of the liner support disc so that alternate blades 17 are associated with each friction liner. Each blade is formed with a through hole 19 which is aligned with the rivet holes 44 and 45 of the associated liner 31 or 32. It can therefore be seen that the aligned rivet holes 19, 44 and 45 relating to any one friction pad are also aligned with a respective one of the apertures 43 in the crown of the other friction liner. This facilitates the fitting of the friction liners by riveting, the holes 19 in the blades being all accessible through apertures 43.

As will be understood from the foregoing, fitting of the liners 31 and 32 by means of the rivets 47 is easy. In summary, the annular support crown is not rigid, which enables it to follow closely the deformations which take place in the pressure plate of the clutch under the effect of heat due to the friction set up with the friction pads, while the perforation of the support crowns of the liners not only reduces inertia but also facilitates fitting of the pads of the friction liners; it is also beneficial for good ventilation.

In general terms, the support crowns enable the number of components to be reduced, while the blades of the liner support disc are able to be made more rigid, so that the support disc is able to rotate at very high speed without any danger of fracture of its blades. Fitting of the liners on the support disc is further facilitated by the flexibility of the support crowns.

It should however be noted that the support crowns 40 are thicker than the associated blades 17 and central portion 16 of the support disc, so as to provide good integrity in the support disc against centrifugal force while at the same time having an acceptable inertia. This reduction in the thickness of the blades, made possible by the support crowns 40, also enables both fretting and inertia effects to be reduced. In addition, economy is made in the material of the liner support disc, the blades of the latter being joined together by the support crowns 40 themselves.

The friction pads 41 and 42 are of course secured adhesively or by brazing on the respective pad sections 33, and they fit well to the blades 17. These latter are axially resilient and of a tripod type, and will be described more fully below.

In each support disc, which is thicker than the central portion 16 of the liner support disc, the apertures 43 formed through its intermediate sections 34 are of closed form, and are trapezoidal in shape as can be seen in FIG. 9. In each of these apertures, the longest side is closest to the inner periphery of the crown 40, the corners of the aperture 43 being rounded. The aperture 43 thus becomes narrower towards the outside, and it will also be noted that the support crown 40 is continuous at its inner periphery. Access to the holes 44, 45, 19, discussed above, is facilitated by these apertures. In this example, the intermediate sections 34 extend over the same external circumference as the pad support sections 33 and pads 41 and 42.

Each friction pad 41 or 42 has a generally triangular shape, with a rounded apex which is directed radially inwardly so as to reduce still further any judder effects resulting from skew or oblique forces. It is also with this in view that the tongues or projections 46 mentioned above are provided at the inner periphery of each first or pad support section 33 of each support crown 40. These tongues 46 are rounded for supporting the rounded apex of the associated pad 41 or 42. Similarly, each section 33 has at its outer periphery a recess 48 having a flat base and two inclined lateral flanks. Each pad 41 or 42 has a complementary slot 49, again with a flat base and inclined flanks, in register with the corresponding slot 48. These slots 48 and 49 reduce inertia and enhance ventilation. Because of the tripod construction of the blades 17 (already mentioned, and still to be described), the slots 48 and 49 improve the mechanical integrity of the friction pads and their support crowns.

In summary, the friction pads 41, 42 have a triangular shape defining two external ears, which are rounded here, together with a rounded, inwardly facing apex.

As will have been understood from the foregoing, the trapezoidal apertures 43 enable the circumferential width of the pad support sections 33 of the support crowns to be increased, with the edges of the apertures 43 having a shape which is complementary to the sides of the friction pads 41 and 42. The pads thus have a circumferential length at their outer periphery which is larger, while at their inner periphery the pads are narrower. The pads 41 and 42 are therefore in partially overlapping relationship at their outer peripheries, as is best seen in FIG. 1. This leads to improvement in the parallel relationship of the friction liners.

Thanks to this arrangement and also to the apertures 43, the friction pads 41 and 42 are well adapted to follow the progressive deformation of the pressure plate of the clutch into a conical shape. They are equally well adapted to follow the similar, but less pronounced, conical deformation of the reaction plate, these deformations being due to thermal effects. In addition, judder effects are minimized when the friction liners 31 and 32 come into contact with the pressure and reaction plates of the clutch, when skew or oblique forces tend to be exerted. In addition, with this arrangement the friction liners 31 and 32 become progressively and smoothly gripped between the pressure and reaction plates, i.e. the axial gripping force increases smoothly.

It is the configuration of the blades 17 of the liner support disc that gives the axial elasticity which produces these advantages. In FIGS. 1 to 10, the blades 17 extend radially, projecting from the outer periphery of the central portion 16 of the liner support disc, with which they are integral. The same is true in the arrangements shown in FIGS. 14 to 33 to be described later in this document. The liner support disc in FIGS. 1 to 10, including both its central portion 16 and its blade 17, is of metal. The blades 17 are spaced apart in two alternate groups 71 and 72 (eight in this example), as already mentioned above, with each blade of any one group being offset circumferentially by 45° with respect to the adjacent blade in the other group. The angle between two consecutive blades is 22½°. This is best seen in FIG. 6, which also shows the tripod configuration of the blades, which each have three flat support surface zones indicated in FIG. 6 at either 21A, 21B or 23A, 23B.

Thus, by contrast with conventional arrangements, the number of blades is increased, these being thinner than the support crowns 40 of the friction liners, while at the same time the foot portion of each blade has a large circumferential width, and is therefore robust.

FIG. 6 shows a blade 71 in one group and the adjacent blade 72 in the other group. Considering for example the blade 72, it can be seen from this Figure that the blade is symmetrical, and includes a large flat central support surface zone 21A for contact with the associated support crown 40 and such is to be secured to the latter. For this purpose the hole 19 is formed in this zone 21A to accommodate the respective rivet 47 mentioned above, for securing the crown 40 to this blade.

The central zone 21A is convergent (as is shown in all of the drawings in which it appears) towards the outer periphery of the liner support disc. At its outer periphery it is generally triangular in shape, but in this example this triangular portion has a truncated apex. The inner portion of the central zone of each blade 71 or 72 is thus wider in the circumferential direction than its convergent outer portion.

The blade 72 also has two flat support surface zones 21B, which are coplanar with each other and which are adapted to cooperate with the support crown of the other friction liner. These zones 21B extend at the outer periphery of the blade, and define a pair of ears. The zones 21B are disposed on either side of the central zone 21A, and have a triangular shape, being joined to the zone 21A through oblique folds 22A which are symmetrical with respect to the radial axis of symmetry of the blade. Thus the zones 21B and 21A are offset axially from each other, while being parallel to each other (see FIGS. 7 and 8). It will be noted in FIG. 6 that at the junction of the zone 21A with the inner end of each fold 22A, there is a generously curved junction edge.

The zone 21A is joined to the central portion 16 of the support disc through another fold 80, oriented tangentially and variously referred to as a longitudinal fold. This fold is perpendicular, in this example, to the radial axis of symmetry of the blade. Thus the zone 21A is offset axially from the central portion 16, as can again be seen best in FIGS. 7 and 8. The junction edges at the circumferential ends of the folds 80 are rounded so as to join these folds to the central portion 16 and to the zone 21A. Each fold 80 thus defines a neck. In addition, each blade has at its outer periphery a central slot 50, which is of generally complementary shape to the slots 48 and 49 (FIG. 9) previously described.

The general shape of the blade 72 is that of a cat's head. The symmetrical shape of the adjacent blade 71 is identical to that of the blade 72, except that its flat central zone 23B is offset axially with respect to the central zone 21A of the blade 72, this central zone 23B being in the same plane as the zones 21B of the blade 72. Similarly, the two flat zones 23A of the blade 71 are offset axially with respect to its central zone 23B, and lie in the same plane as the central zone 21A of the blade 72.

The two zones 23A are joined to the zone 23B through oblique folds 22B extending in opposite axial directions from the folds 22A of the blade 72. The central zone 23B is joined to the central portion 16 of the liner support disc through a tangential fold 81 which extends in the opposite axial direction from the longitudinal fold 80 of the blade 72. In this example, the longitudinal folds 80 and 81 constituting the respective foot elements of the two blades have the same circumferential width in this example. The distance between the central portion 16 and the central support surface zone of each blade is here referred to as its length.

In summary, each metal blade as described above and shown in FIGS. 1 to 10 has a central support surface zone for contact with one of the two friction liners, and two external peripheral support surface zones for contact with the other friction liner, the said central zones being offset axially with respect to the peripheral zones (and, here, also offset with respect to the said central zone 16 of the liner support disc), the central and peripheral zones of the blade extending in planes which are parallel to the mean plane of the central portion of the support disc. The peripheral zones partly support the peripheral ears of the friction pads 41 and 42, and this is why they have the triangular shapes, as mirror images of each other, which can be seen in FIG. 6.

The said peripheral zones extend on either side of the central support surface zone of the blade, while the latter is joined, firstly to the central portion of the liner support disc through a tangential fold, and secondly to the said peripheral zones through oblique folds.

The oblique peripheral folds 22A and 22B are in the shape of a truncated V. Each blade 71 is separated from the adjacent blade 72 by a radial slot 24, FIG. 6, which terminates in a blind widened portion 26 at its foot, and which has a second widened portion 25 at the level of the folds 22A and 22B. Thus, the support crowns 40 of the friction liners are not in the same plane as the central portion 16 of the support disc, but are offset axially from it.

It will also be appreciated that the foot elements of the blades, consisting here of the folds 80 and 81, are very close to each other, and are very wide and therefore very strong. As a result, the blades 71 and 72 are able to rotate at higher speeds of rotation than before, due to their radial symmetry, which eliminates bending forces in the foot elements of the blades under the effect of centrifugal force. The peripheral zones 21B and 23A of the blades are arranged to make contact with the outer peripheries of the friction pads 41 and 42, and more precisely support the ears of the latter, hence why they are referred to as tripod blades.

The slot 50 is formed on each blade centrally at its outer periphery, and has a flat base and two inclined flanks as described above. Together with the corresponding slots in the friction pads and the support crowns 40, the slot 50 lie between the peripheral contact zones 21B and 23A.

As already mentioned, and as can be seen in FIG. 1, the friction pads 41 have some overlap with the pads 42 at their outer peripheries. Thus for example, the zone 23B of the blade 71 carries the pad 41 which is fixed to it, while the zones 23A serve to support the peripheral ears of the friction pad 42.

This structure enables the support crowns 40 to tilt with respect to a transverse plane, and to accommodate the tendency of the pressure plate and reaction plate of the clutch to become deformed into a conical configuration. This ability of the crowns to follow the deformation of the plates is due mainly to the fact that the inner periphery of the crowns 40 is spaced away from the central portion 16 of the liner support disc. The zones 21B and 23A, together with the offset of the zones 21A and 21B with respect to the central portion 16 of the liner support disc, lead to the good axial progression already referred to of the clutch engagement operation.

It will also be noted that the blades 71 and 72 are bi-directional, with one half of the distance between the two friction liners 31 and 32 being defined by the blade 72, while the other half is defined by the blade 71. This economizes the blades, and in particular the holes 19 and rivets 47. The blades are adapted to the shape of the friction pads 41 and 42, and are also elastic in the axial direction.

It is of course possible to reduce the amount of material in the intermediate sections 34 of each support crown by eliminating all or part of the outer web defining the outer edge of the aperture 43, as indicated in broken lines in FIG. 9.

Reference is now made to FIGS. 11 and 12, showing another form of support crown for a friction liner in accordance with the invention. In FIGS. 11 and 12, the support crown, friction pads, and intermediate sections of the crown, are designated by the reference numerals 140, 141 and 142, and 134 respectively. The first or pad support sections 33 of the crown have a shape which is identical to that previously described, but in this case the intermediate sections 134 are each formed with an aperture 143 which opens toward the outside, in this example centrally of the aperture 134. This arrangement is particularly favorable, because it reduces the stresses which are set up under the effect of heat. The inner periphery of the zones 134 is able to deform with respect to the sections 33 without any danger of rupture occurring.

In this example the inclined flanks of the friction pads 141 and 142 are chamfered, so that the pads are triangular in shape, with a recess 49 formed in the base of each triangle, which has two chamfered sides 250. The chamfers 250 reduce any binding effects that may occur between the friction pads 41, 42 and the support crowns 40. In this connection, the crowns 140 expand and contract under the effect of heat in a different way from the friction pads, especially when the latter are made of a sintered material, and more especially where it contains copper particles. The chamfers 250 prevent any likelihood of the pads breaking up.

Figure 14:
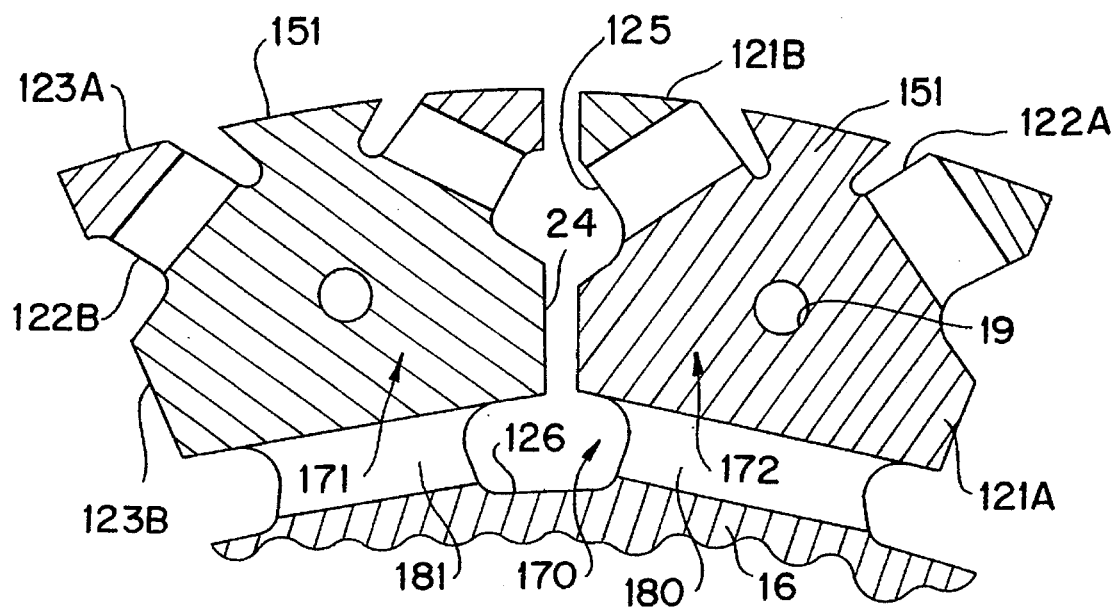
FIG. 14 is a view similar to FIG. 6, but in relation to a further embodiment of the invention.

The present invention is of course not limited to the embodiments already described. For example, and referring now to FIG. 14, the blades of the liner support disc may be made in a modified form in which each blade has a central support surface zone 121A or 123B, which is augmented by forming an external peripheral tongue 151. This tongue permits ventilation and projects outwardly beyond the slots 48, 49 (FIG. 9) of the friction pads; thus the apex of the central zone of each blade is here modified. In FIG. 14 the tripod blades, generally designated by the reference numeral 170, are divided into two sets of blades 171 and 172, and it will be seen that with this construction they offer an increased bearing surface. The tangential folds or foot elements 180, 181 have different widths, which enable the blades to be given different values of stiffness. It will be appreciated that this is made possible because the invention enables the width of the feet of the blades to be made larger than usual in the first place.

In FIG. 14 the blade 172 has a fold 180 which is wider than the fold 181 of the other blade 171. Thus the blade 172 is stiffer than the blade 171. In practice, these blades 171 are secured to the friction liner which is intended to engage with the pressure plate of the clutch.

It will also be noted that the axial offset of the zones 121A from the central portion 16 of the liner support disc is different from the axial offset between the zone 123B and the central portion 16. This axial offset is smaller for the stiffer blades (i.e. those on the reaction plate side), and this enhances the progressive effect of the clutch engagement operation.

The blades 172 associated with the reaction plate are accordingly stiffer than in the embodiments described above, but this is of no consequence because the reaction plate is less liable to become deformed to a conical shape. The same effect could be obtained by providing folds 180, 181 of the same width but of different lengths (i.e. with different distances between the central portion 16 and the zones 121A or 123B of the blades concerned).

It will be noted that in FIG. 14, the slot 24 between two consecutive blades is modified, with the widened portions 125 and 126 being asymmetrical. Also, the peripheral support zones 121B and 123A have different configurations, the zones 121B being of generally triangular shape, while the zones 123A are quadrilateral in shape and more elongated circumferentially. There is also a difference in size between the oblique peripheral folds 122A and the corresponding folds 122B of the other blade, the folds 122A being longer (in terms of the distance between the support zones) than the folds 122B, and therefore being more flexible. It will thus be seen that the stiffness of the peripheral support zones extending on either side of central support zone can be varied by making variations in the length and width of the oblique peripheral folds of the blades.

Figure 15:
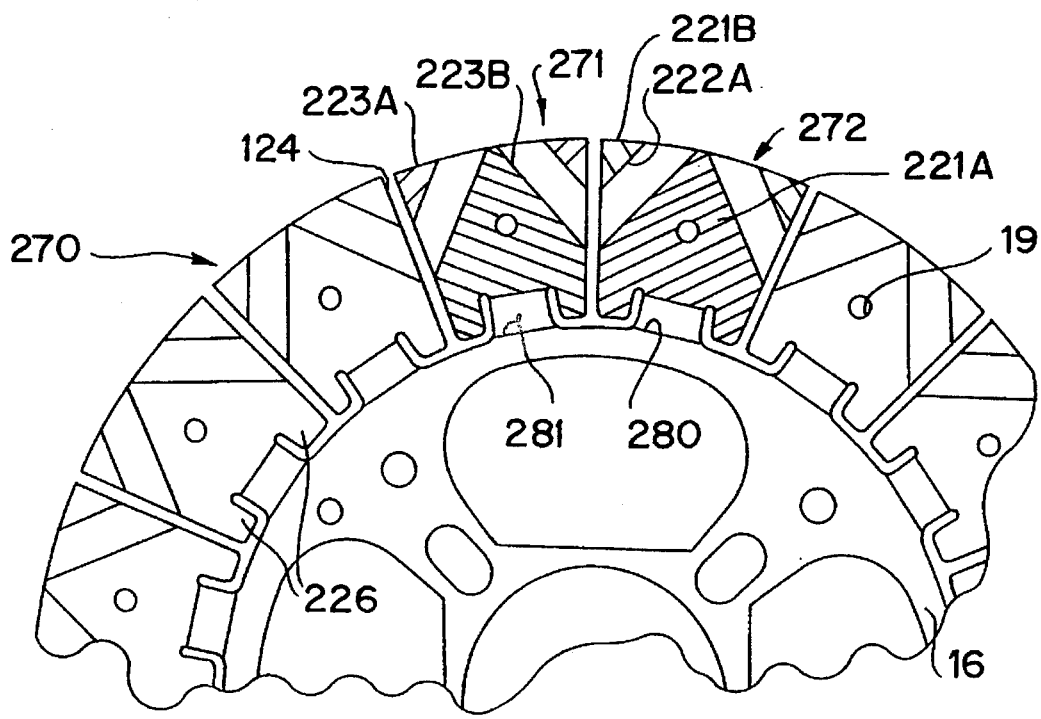
FIG. 15 is a view in elevation showing part of the liner support disc in another embodiment of the invention.

FIG. 15, to which reference is now made, shows an example of this. In FIG. 15 two consecutive blades are indicated at 271 and 272, and have peripheral folds 222A, which are of increased width. In addition, each radial slot 124 between two consecutive blades 271 and 272 is of constant width over its radial length, and is also more narrow.

Also in FIG. 15, the support zones 223B and 221A have pointed outer ends so that these zones are essentially triangular, having at their inner periphery a pair of inwardly projecting radial extension lugs 226 which flank between them the tangential folds 280, 281, these folds being of reduced length.

Figure 16:
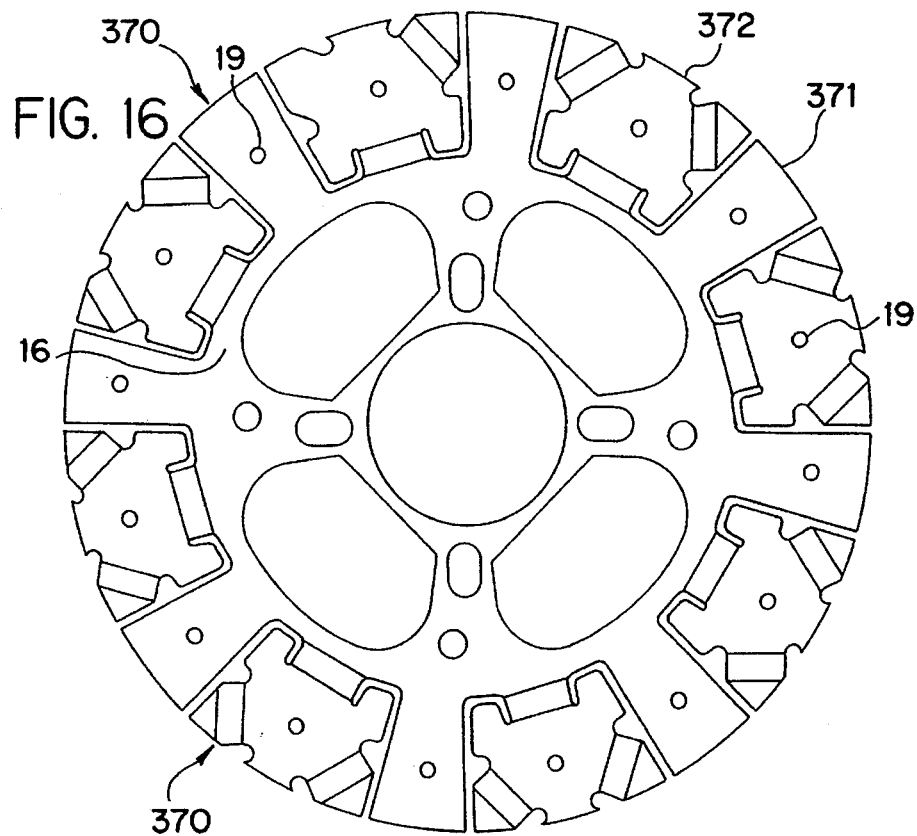
FIG. 16 is a view similar to FIG. 15, but relates to yet another embodiment of the invention.
Figure 17:
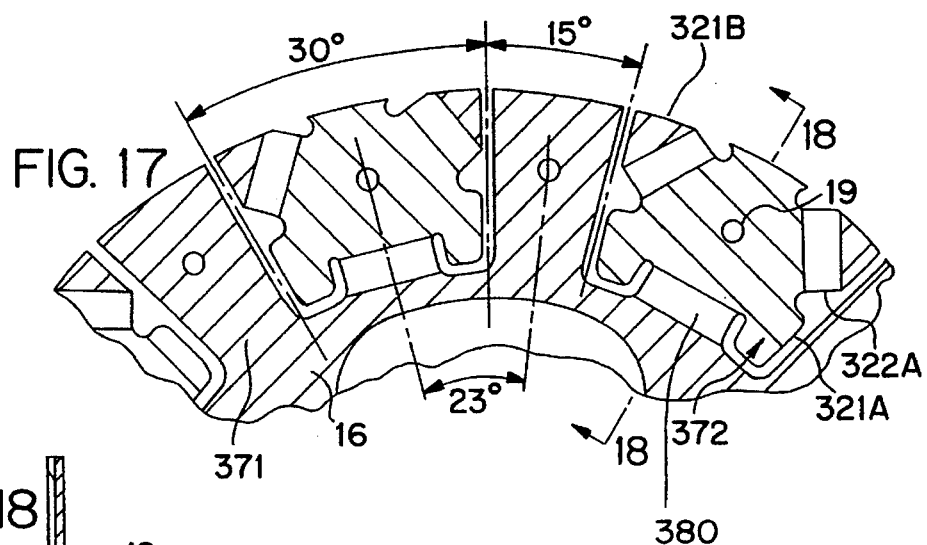
FIG. 17 is a view on an enlarged scale showing part of the liner support disc of FIG. 16.
Figure 18:
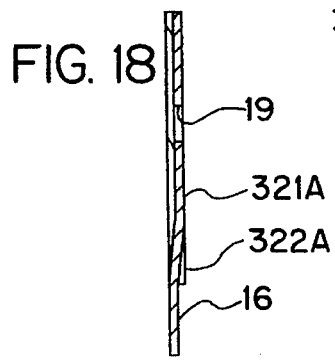
FIG. 18 is a view in cross section taken on the line 18—18 in FIG. 17.

Reference is now made to FIGS. 16 to 18. In this embodiment, there is only one series of tripod blades, these being somewhat similar to those in FIG. 14 at their outer periphery and similar to those of FIG. 15 at their inner periphery. The other series of blades is here replaced by simple radial blades 371 in the form of radial tongues lying in the same plane as the central portion 16 of the liner support disc. In this case, each of these blades 371 of the disc has only one support surface, while the other blade is widened circumferentially as compared with those in FIG. 14 or FIG. 15. Thus in this case the tripod blades, 372, are arranged alternately with the set of tongue blades 371. Each tripod blade 372 does however have a circumferential length of 30°, while each tongue blade 371 subtends only 15°. The circumferential length or pitch between the axes of the blades 372 and 371 remains, as before, 22½° as shown in FIG. 17.

It will be noted that the tongues 371 have a large enough elasticity to be able to accommodate the tendency of the reaction plate to assume a conical shape. The width of the folds 380 and 322A of the blades 372 is also increased, as is the axial offset between the central portion 16 of the liner support disc and the central support surface zones 321A of the blades 372. The blades 372 are increased in flexibility.

Figure 19:
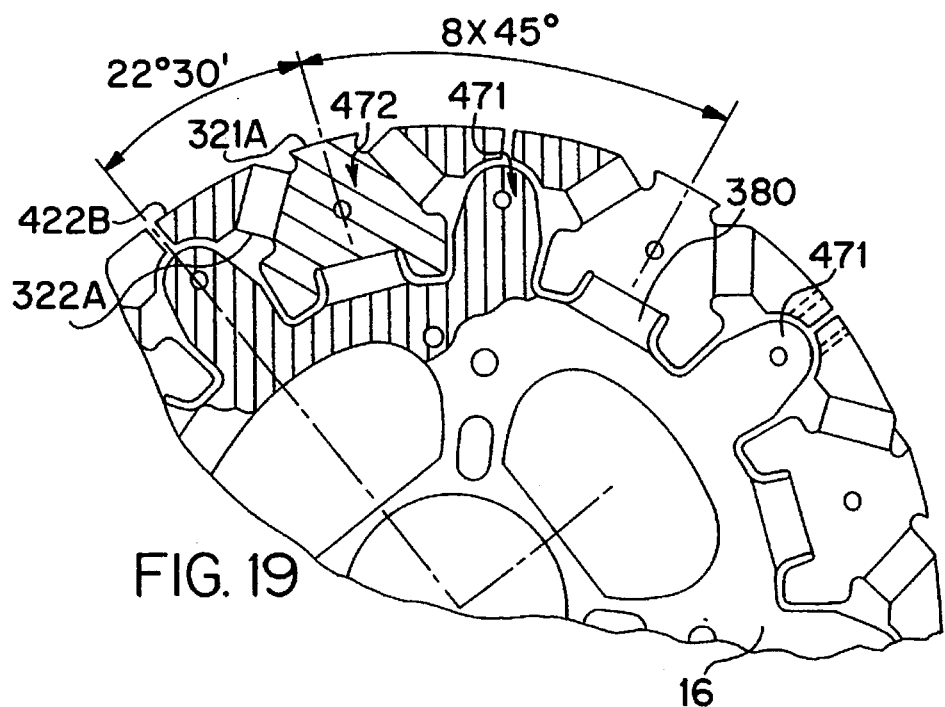
FIG. 19 is a view of the liner support disc in yet another embodiment of the invention.

Referring now to FIG. 19, this shows another variant in which the surface of the peripheral support zones, 422B, of the blades (indicated at 472) is substantially increased. In this case the radial tongues 371 of FIGS. 16 to 18 are replaced by blades in the form of radial tongues 471 which are partly enveloped by the blades 472. The tongues 471 are in the same plane as the central portion 16 of the support disc, and the outer end of each tongue 471 is rounded, being partly enveloped by the peripheral zones 422B of the adjacent blades 472. These zones are generally in the form of birds' wings. Thus at least one of the peripheral support zones 422B partly envelops a radial tongue blade 471. In this example it is the two adjacent zones 422B of two consecutive blades 472 that envelop one blade 471, with the blades 471 lying radially inwardly of these zones 422B, so that they are shorter than the blades 371 in FIG. 17. In other words, one blade 471 is enveloped by two consecutive blades 472.

Figure 20:
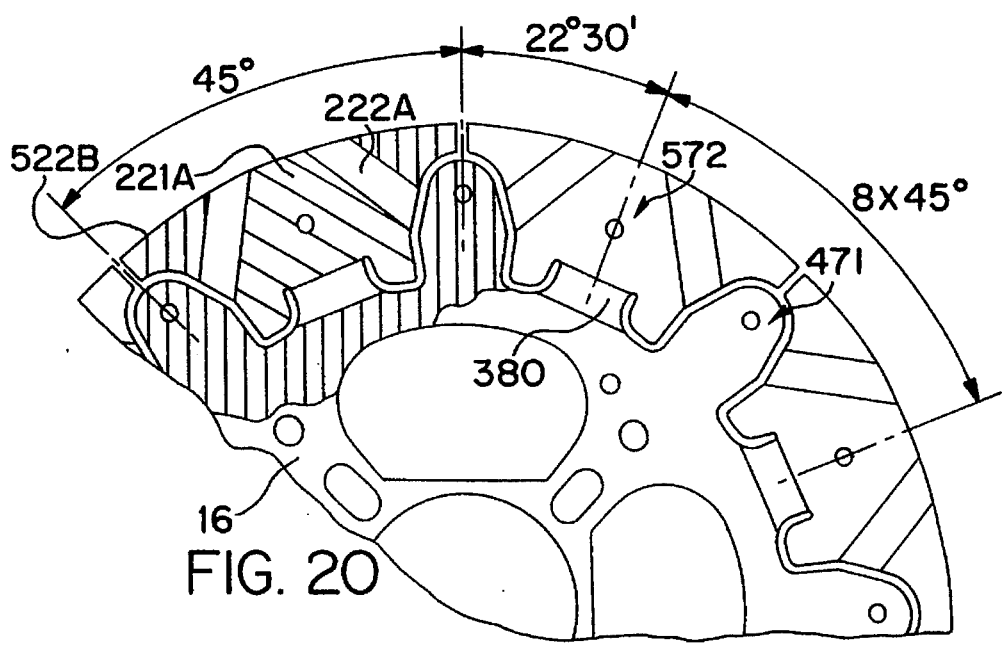
FIG. 20 is a view similar to FIG. 19 but illustrating a further embodiment of the invention.

It is of course possible to increase the width, i.e. the distance between the free edges, of the peripheral folds by giving each tripod blade a configuration similar to that of the blades 271, 272 in FIG. 15. Such an arrangement is shown in FIG. 20, to which reference is now made. In FIG. 20, the tripod blades 472 of FIG. 19 are replaced by tripod blades 572, the peripheral folds 222A of which are wider than the folds 322A in FIG. 19. In this case, there is a slight gap between the rounded blades or tongues 471 and the tripod blades 572.

In all of FIGS. 14 to 20, the friction liners can easily tilt. The blades of FIGS. 16 to 20, divided into two sets or series, offer a maximized surface area for support of the friction liner 31 associated with the pressure plate of the clutch.

However, it is of course possible to combine various features of the different embodiments described so far. Thus, the apertures in the second or intermediate sections of the support ring of a friction liner are not necessarily identical with each other. For example, some of them may be open and others closed. Similarly, some of these intermediate sections may be provided with oblong apertures, with others having trapezoidal apertures. Either one, or both, of the friction liners 31 and 32 may be equipped with friction pads of rectangular shape, together with other pads which are triangular. The ears of the friction pads may have flat circumferential edges.

Figure 21:
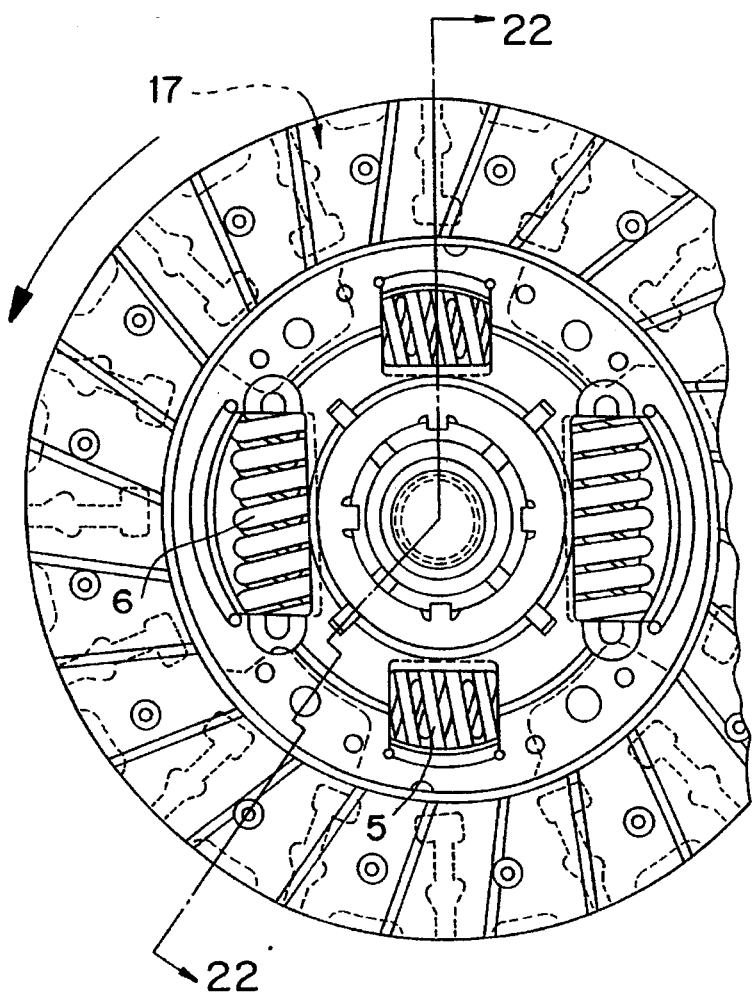
FIGS. 21 and 22 are views similar to FIGS. 1 and 2 respectively, but illustrate an embodiment having continuous friction liners, with the cross section of FIG. 22 being taken on the line 22—22 in FIG. 21.
Figure 22:
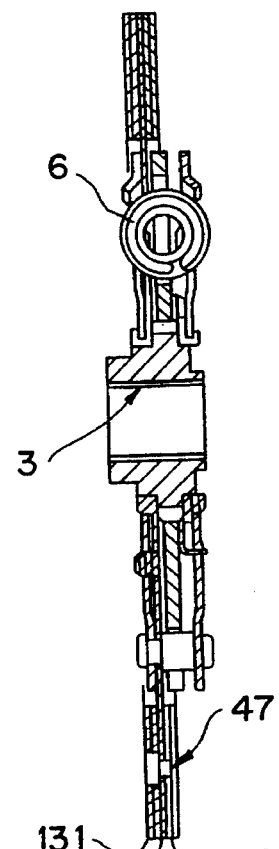
Figure 23:
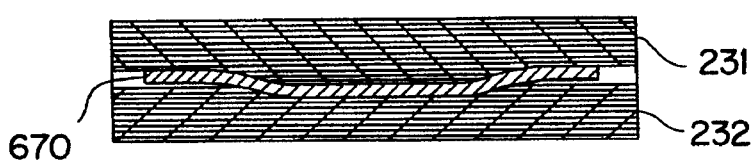
FIG. 23 is a developed view in transverse cross section showing a support blade of the prior art, carrying friction liners and seen in its condition under maximum load.

The invention is of course applicable universally. Reference is now made to FIGS. 21 and 22, and to FIGS. 24 and 28. These show clutch friction wheels in accordance with the invention having friction liners 131 and 132, which may be of the organic type as described in the specification of French published patent application FR 2 094 693A, that is to say liners which are circumferentially continuous or endless, and which are for example reinforced with glass fibres, with KEVELAR (Trade Mark) or other suitable materials. In this case, the friction liners have neither a support crown nor friction pads. However, in a variant, the friction liners may consist of a plurality of segments, which may for example comprise two friction pads, with the said segments being interlaced between one friction liner and the other.

An arrangement can also be designed having two liner support discs in contact with each other, with one of these discs carrying for example the blades 172 of FIG. 14 and the other having the blades 171 of the same Figure. In that case, the thickness of the discs is reduced.

In all cases, the blades have central support surface zones which offer a large surface area, with an internal portion which is wider circumferentially than its outer portion, the latter becoming narrower in a direction away from the axis of the assembly. This reduces embedding and judder effects, because the friction liners remain in a properly parallel plane. The liner support disc is thus able to rotate at high speed, while being able to follow the change of shape of the pressure plate as the latter becomes more conical.

The blades may of course have an asymmetrical shape, especially at the level of their peripheral support surface zones, with one blade having a different length from the other.

It will be appreciated that the tangential folds and the oblique folds give the tripod blades good stability, which in turn enables good contact to be obtained for the friction liners, especially with the pressure plate of the clutch; and this reduces wear in the liners.

The foot element of any blade may not consist simply of the corresponding tangential fold: the latter may be joined to the central part of the support disc through a foot or root portion.

It is possible to provide each blade that is in the form of a tongue with at least one additional support surface zone. Such an arrangement is shown in FIGS. 24 to 33, to which reference will be made below.

Referring first to FIGS. 24 to 27, the liner support disc shown in these Figures has a central portion 16, and, integral with the latter, a peripheral portion which is divided into radial support blades of the tripod type 672 in circumferential alternation with a series of further radial blades in the form of tongues 671, which lie in the same plane as the central portion 16 of the liner support disc. Here, the blades 672 and tongues 671 are arranged at regular intervals around the circumference.

Each cranked, or tripod, blade 672 is joined to the central portion of the disc through a foot element 480, and has a central support surface zone 423 and two peripheral support surface zones 422. The central zones 423 are for securing a friction liner 132 to the blades 672, while another friction liner 131 is secured to the tongues 671. To this end, the tongues 671 and the central zones 423 of the blades 672 have holes 19, in this example, which are spaced apart on a common pitch circle, for securing the liners 131 and 132 to the liner support disc, again in this example by means of rivets 47 as shown in FIG. 24.

More precisely, the liner support disc with its friction liners 131, 132 is show as part of a clutch friction disc comprising two coaxial parts which are mounted for movement with respect to each other against the action of circumferentially acting resilient means 5 and friction means 20, acting axially in the same way as described with reference to earlier embodiments herein. Here, as in FIGS. 1 to 4, the damper plate 4 is rotatable with the hub 3, subject to the action of loose coupling means such as the kind described above with reference to FIG. 4.

The friction means comprise a friction ring which is interposed axially between the damper plate 4 and the guide ring 1, together with a thrust ring which is mounted on the guide ring 2 for rotation by means of axial lugs which are engaged in apertures formed in the guide ring 2. A spring bears on the guide ring 2 and biasses the thrust ring into contact with the damper plate 4. The liner support disc is equipped with two annular friction liners 131 and 132 mounted back-to-back, on either side of the central portion 16 of the support disc. Here again, the latter is of metal.

The friction liners 131 and 132 are normally gripped between the pressure plate and reaction plate (not shown) of the clutch, which as before are rotatable by the crankshaft of the internal combustion engine of the motor vehicle, while the hub 3 is coupled in rotation with the input shaft of the gearbox of the vehicle by means of its internally splined bore. During the operation of disengaging the clutch (or declutching), the friction liners 131 and 132 are released so that in the declutched position, they are no longer in contact with the pressure and reaction plates. When the clutch is reengaged, the liners 131 and 132 are gripped between the pressure and reaction plates in an elastically or resiliently progressive manner. This progressive gripping action is due here mainly to the tripod blades 672, and more particularly it is due to their peripheral support zones 422.

The tripod form of each blade 672 is defined by three flat support surface zones 422 and 423 respectively. The flat central zone 423 is in contact with the friction liner 132 associated with the pressure plate, and also serves for securing the friction liner 132. This zone 423, as in all the Figures, is convergent towards the outer periphery of the clutch support disc. The zones 422 extend peripherally on either side of the central zone 423. They have a generally triangular shape and are joined to the central zone 423 through oblique folds 421 which are symmetrical with respect to the radial axis of symmetry of the blade 672. The zones 422 and 423 are offset axially, and are parallel to each other. More precisely, the zones 422 are arranged to make contact with the friction liner 131 associated with the reaction plate of the clutch. In this example they extend in the same plane as the central portion 16 of the support disc.

The central zone 423 is joined to the central portion 16 of the support disc through a tangentially oriented fold 480 (or longitudinal fold) which is here at right angles to, and symmetrical about, the radial axis of symmetry of the blade. This fold 480, which is axially oblique, constitutes the foot of the blade and offsets the zone 423 axially with respect to the central portion 16.

Thus, while the friction liners 131 and 132 are being compressed, the zones 422 deform axially. It will be noted that the folds 480 are of substantial width, and therefore very robust, and that the zone 423 has two internal areas which flank the foot element 480. The blades 672 are separated from the tongues 671 by slots 24, each in the form of a crook. These slots are open at the outer periphery of the liner support disc, while the inner end of each slot 24 is a C-shaped closed end portion joined to the folds 480.

Each blade 672 extends circumferentially over a substantial width, these blades defining in this example a pitch of 45°, so that an angle of 22½° exists between the axis of symmetry of a blade 672 and the axis of symmetry of an adjacent tongue 671. The same angle is therefore defined between two consecutive holes 19. Each tripod blade 672 is thus flanked in a regular manner by two tongues 671, with the holes 19 being spaced apart circumferentially.

At least some of the tongues 671 are arranged with a supplementary support surface zone 622 at the outer end of the tongue. This zone 622 is joined to the main body of the tongue through a junction fold 621, whereby the zone 622 is offset axially towards the central zones 423 of the adjacent tripod blades. Thus, during compression of the friction liners 131 and 132, this zone 622 is arranged to make contact with the liner 132, so as to offer a reaction surface. The zone 622 therefore constitutes a stabilizing zone which, in this example, extends in the same plane as the central zones 423 of the adjacent tripod blades 672, by virtue of the oblique fold 621. In a modification, the zone 622 may be slightly withdrawn with respect to the zone 423.

With these arrangements, the liner 131 remains substantially flat.

In this example each tongue 671 is quite slender, with its root zone (whereby it is joined to the central portion 16 of the support disc) being wider than its outer periphery constituted by the above mentioned supplementary support zone 622. It should be noted that the outer periphery of the zone 622 lies at the same radius as the outer circumference of the tripod blades 672. Thus each tongue 671 comprises, integral with each other, a main portion 623 for support and fixing of the liner 131 by means of the holes 19, a radial junction fold 621, and the support surface zone 622. The depth of the fold 621 is greater than the depth of the surface 622. These radially oriented tongues 671 are accordingly supple and flexible. Their slenderness gives the combination of the fold 621 and support surface 622 considerable suppleness.

It will be noted that the free end portion 622, 621 of each tongue 671 is of reduced circumferential width, which confers even more suppleness on the surface 622. It will also be noted that the latter extends circumferentially between two zones 422 at the outer periphery of the support disc.

The above arrangement gives a liner support disc which has at its outer periphery large support zones which reduce the effects of embedding and judder, because the friction liners 131, 132 remain in a parallel plane. The liner support disc, and therefore the clutch friction wheel itself, are thus able to rotate at high speed, while being able to adapt to the deformation of the pressure plate and reaction plate which tends to cause them to adopt a conical shape. Another effect is improved distribution of wear in the friction liners.

It will be appreciated that the folds 480 and 621 give good stability to the clutch friction disc, which enables good contact of the friction liners with the pressure plate and reaction plate to be obtained, and this in turn reduces wear in the friction liners still more.

In this example, the support zone 622 of each tongue has a smaller radial height than the peripheral surfaces 422 of the tripod blades. The peripheral height of the fold 621 and of the zone 622 are together generally equal to that of the oblique zone 422 of the blade 672. In this connection, what is sought here is an additional point of support, combined with suppleness.

In a modification, it is possible to modify the stiffness of the zone 622 in a simple way by reducing or increasing the length of the fold 621, so that the outer periphery of the tongues may extend over a circumference having a diameter which is either smaller or greater than that of the circumferential length of the outer periphery of the blades 672.

It will be appreciated that the good equilibrium of the clutch friction wheel, and the good flatness of its friction liners, are due especially to the regular spacing of the fixing holes 19 and their position on the axis of symmetry of the tongues 671 and tripod blades 672.

The simplicity of manufacture involved in these components will also be appreciated. This is due to the radial displacement which it is possible to make with the cutting tool, enabling discs having tripod blades and tongues of different heights to be made.

In these examples, in the position in which the clutch is engaged (with the friction liners 131 and 132 gripped), there is a space between the two liners 131 and 132, such that the blades 672 are not totally pressed flat. The liners are therefore able to adapt to the shape of the pressure plate and reaction plate.

As can be seen in broken lines in FIG. 2, the folds 621 and zones 622 are of course not necessarily symmetrical, and there may be alternation of the asymmetry from one tongue to another.

It may be desirable in some cases to increase the number of fasteners such as the rivets 47 described above. Such an arrangement can be seen in FIGS. 28 to 33, in which the liner support disc has a central portion 16 and a peripheral portion which is divided into radial blades 771 arranged in circumferential alternation, in this example at regular spacings, with a series of radial tongues 772 which lie in the same plane as the central portion 16 of the liner support disc. In these Figures, the blades 771 and the tongues 772 are integral with the central portion 16.

Figure 28:
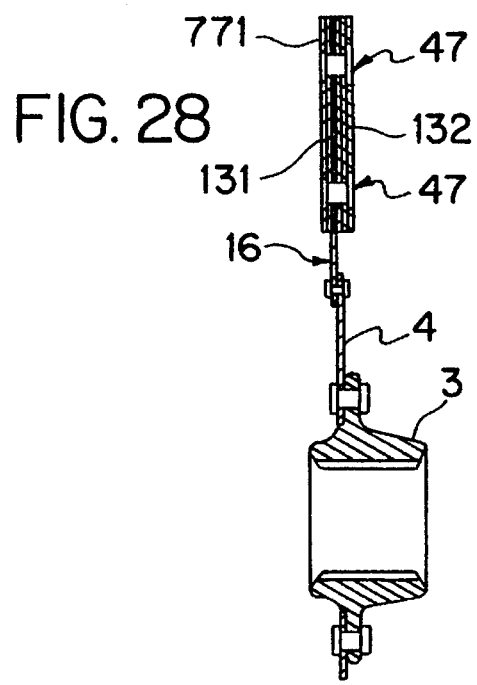
FIG. 28 is a view in axial cross section showing part of a clutch friction wheel equipped with a liner support disc in a further embodiment of the invention.

Each blade 771 is joined to the central portion 16 through a foot element 724, and has a central support zone 722 and two peripheral support zones 723. The central zone 722 serves for securing a friction liner 132, while the tongues 722 serve for securing another friction liner 131. To this end, the tongues 772 and the central zones 722 of the blades 771 have, in this example, holes 19 for securing the liners 131 and 132 to the liner support disc, which is achieved, as in the previous examples, with the use of rivets 47 which are shown in FIG. 28.

In more detail, the liner support disc with its liners 131, 132 is here part of a clutch friction wheel (FIG. 28), which includes the liner support disc secured by riveting to the damper plate 4. The latter is secured to the hub 3, the clutch friction wheel thus being of the rigid type. The annular liners 131 and 132 are mounted back-to-back, on either side of the central portion 16 of the support disc, as in FIGS. 24 to 27. Thus, when the clutch is reengaged, the liners 131 and 132 are gripped progressively, and elastically, between the pressure plate and reaction plate of the clutch. This progressive gripping action is due in this example mainly to the tripod blades 771, and more particularly to their peripheral support zones 723 and to the foot elements 724. The tripod shape of the blades 771 is defined by three flat support or engagement surfaces indicated respectively at 723 and 722.

The flat central zone 722 is in contact with the friction liner 132 associated with the pressure plate, and is convergent towards the outer periphery of the liner support disc. The zones 723 are disposed peripherally on either side of the central zone 722. Their shape is generally triangular, and they are joined to the zone 722 through oblique folds 721 which are symmetrical about the radial axis of symmetry of the blade 771. These folds 721 are oblique in the radial direction and inclined in the axial direction.

The zones 723 and 722 are offset axially, but are parallel with each other. More precisely, the zones 723 are arranged to make contact with the friction liner 131 associated with the reaction plate of the clutch. In this example, they are in the same plane as the central portion 16 of the support disc.

The central zone 722 is joined to the central portion 16 of the support disc through a tangentially oriented fold 724, or longitudinal fold, which in this example is at right angles to the radial axis of symmetry of the blade. This axially oblique fold 724 constitutes the foot or root element of the blade, and defines an axial offset of the zone 722 with respect to the central portion 16.

Thus, during compression of the friction liners 131 and 132, the zones 723 deform axially. It will be noted that the folds 724 are of substantial width and are therefore very robust. Vertical slots 224 separate the blades 771 from the tongues 772. These slots are open at the outer periphery of the liner support disc, the closed inner end of each slot being circular and joined to the folds 724 and to the central portion 16. Each cranked blade 771 extends over a smaller circumferential length than those described with reference to the earlier Figures, so that the tongues 772 are of increased circumferential width, this width being in fact nearly as great as that of the blades 771. The support surfaces for each friction liner are thus as close as possible. The purpose of this is to preserve the largest possible support surface area for the friction liners 131 and 132, but with the smallest possible distances between the zones of engagement.

The number of blades is therefore increased. The clutch friction wheel being large in this example, there are at least two rows of fasteners 47, such as the rivets mentioned above, or screws or bolts, for securing the friction liners 131, 132. Thus, at least some of the blades 771 have at least two fastening holes 19 through which the appropriate fasteners are passed. Thus, the liner support disc is characterised in that, for at least some of the tripod blades 771, the central zone 722 of the blade is extended centrally (at 725) radially inwardly by virtue of a slit 726 formed in the longitudinal folds 724, the extension 725 of the central zone being formed with an additional hole 19 for receiving a fastener 47, which in this example is a rivet 47. The overall support surface for the friction liner 132 is thus increased.

As can be seen in FIG. 9, a further fixing hole 19 is formed at the outer periphery of the central zone 722 and of the blade 771. The holes 19 lie in the same plane and are separated from each other radially by a substantial distance, being here formed radially on the axis of symmetry of the blade 771.

The tongues 772 have a similar appearance to the blades 771. In this example each tongue 772 has a central zone 823 in the same plane as the central portion 16 of the liner support disc, together with two peripheral stabilising zones 822 which are on either side of the central zone 823. A fold 821, which is oblique in the radial direction and inclined in the axial direction, joins each zone 822 to the peripheral portion of the central zone 823. The stabilizing zones 822 are offset axially towards the central zones 722 of the blades 771.

Two fixing holes 19, in a common plane, are provided in each central zone 823. These holes 19 are aligned radially with each other on the radial axis of symmetry of the tongue 772, and are arranged on the same pitch circles as the holes 19 in the blades 771. In some of the tongues 772, these holes are aligned radially with a fixing hole 119 for securing (by riveting as in FIG. 1) the central portion 16 to the damper plate 4, which is itself secured by riveting to a flange of the hub 3.

Figure 29:
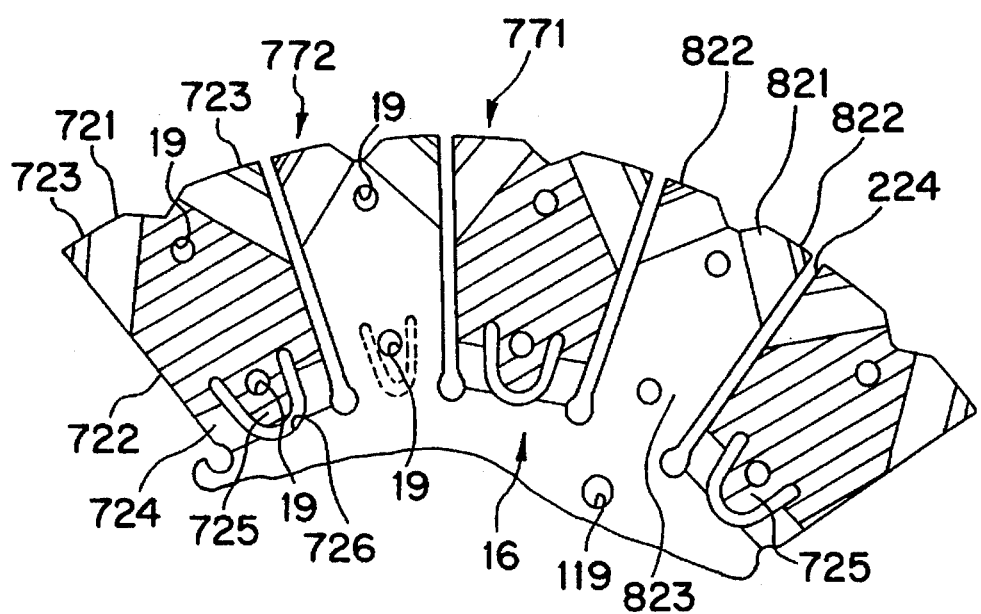
FIG. 29 is a view in elevation showing part of the same disc as in FIG. 28, on an enlarged scale and with its support surface zones shown hatched.

It is also possible to adopt a modification which is shown in broken lines in FIG. 29, and in which the tongues 772 are replaced by a second series of cranked tripod blades having a shape similar to that of the blades 771, with a longitudinal fold joining the central zone to the central portion 16 of the liner support disc, with each blade in this second series again having a slit similar to the slit 726.

In this example the slit 726 has the form of a letter V but with a rounded base as shown in FIG. 29, with the notional apex of the V being directed towards the axis of the clutch friction wheel (i.e. towards the axis of the central portion 16 of the support disc). Accordingly, the shape of the extension 625 is also that of a rounded letter V. Extension 625 constitutes a lug which is oriented generally radially, as in the other Figures which will be described below. The slit 726 extends across the fold 724, and also extends locally into a small part of the central zone 722 and the central portion 16 of the support disc. The fold 724 is thus divided in two, which improves the progressiveness of the gripping effect discussed above. The fold 724 is mechanically strong in spite of the presence of this slit.

It will be noted that the extension 725 is joined by a divergent root zone with respect to the central zone 722. This reduces the chances of fracture. It will also be noted that the radial axis of symmetry of the slit 726 is coincident with the radial axis of symmetry of the blade 771.

Figure 30:
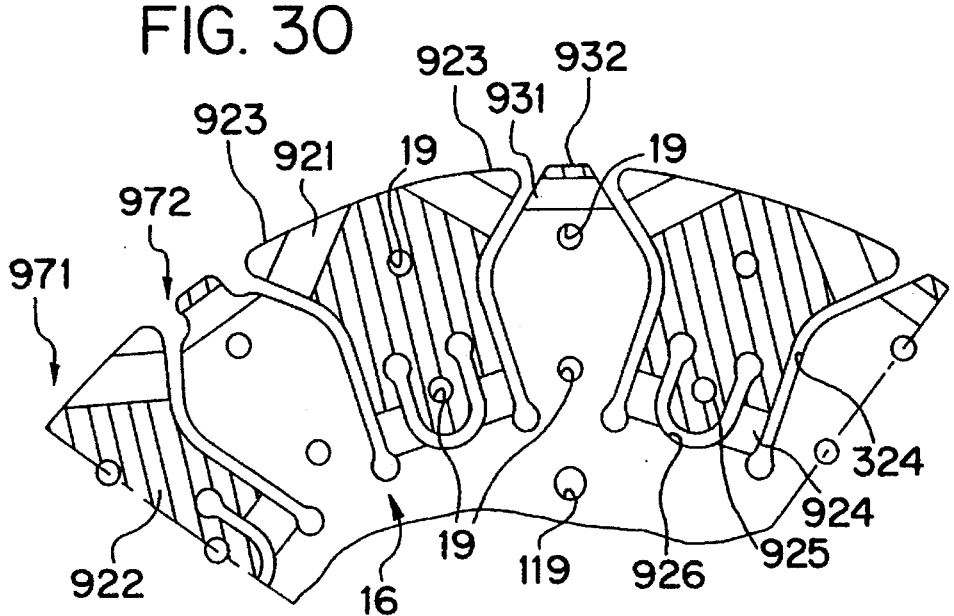
FIG. 30 is a view similar to FIG. 29, but shows a first modified version of the liner support disc shown in FIG. 29.

Reference is now made to FIG. 30, showing a modified liner support disc having tripod blades 971 arranged alternately with tongues 972. In FIG. 30, at least some of the tongues 972 are arranged with a terminal support surface zone 932 at their free ends, joined to the remainder of the tongue through a junction fold 931. The zone 932 is offset axially towards the central zones 922 of the tripod blades 971. The free end of each tongue 972 is reduced in circumferential width. The tongues 972 are in fact narrow at their outer periphery, while they are wider centrally. These tongues are convergent towards the central portion 16, in the plane of which the main portion of the tongue 972 is situated. The slots 324 which separate the tongues 972 from the blades 971 accordingly have a bent shape, comprising a vertical portion at the inner periphery of each slot, joined to an inclined portion which, in turn, is open at the outer periphery of the blades 971. The peripheral support zones 923 of the blades 971 are joined through inclined folds 921 to the central zone 922 of the blades, each blade being generally in the shape of a letter T, and having a longitudinal fold 922 across which a slit 926 is formed as in FIG. 29.

In this example each slit 926 has the shape of a letter U, in which the ends of the branches of the U are circular in shape and are located in the central zone 922. Therefore, the extension 925 is also U-shaped, having a narrow root zone through which it is joined to the central zone 922. The base of the U of the extension 925 is directed towards the axis of the assembly, i.e. towards the axis of the central portion 16.

Figure 31:
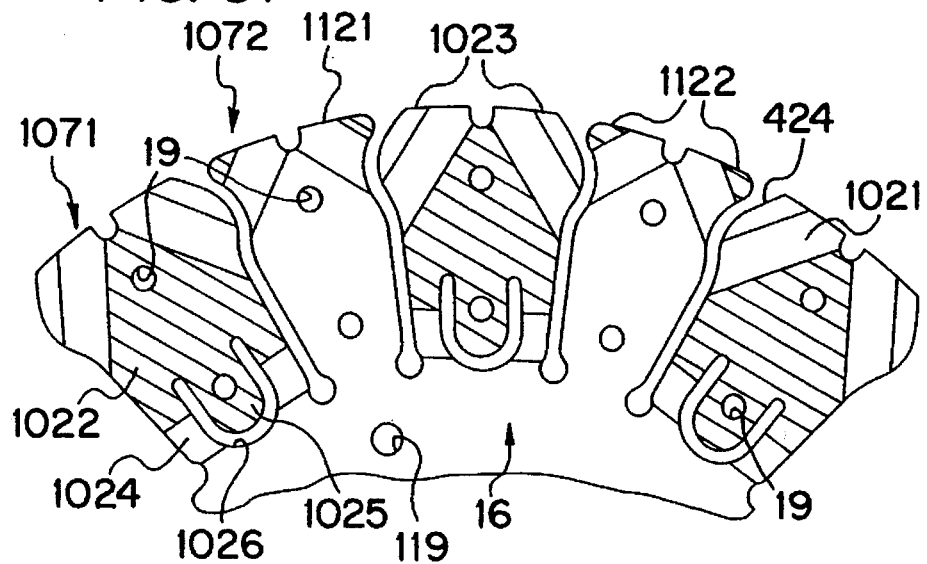
FIG. 31 is another view similar to FIG. 29, but shows a second modified version of the disc of FIG. 29.

Reference is now made to FIG. 31, showing another modified version of the liner support disc. In FIG. 31 the tripod blades are denoted by the reference numeral 1071, and they are arranged alternately with blades in the form of tongues 1072. The blades 1071 have radially oblique folds 1021 and longitudinal folds 1024, which are arranged in regular circumferential alternation with the tongues 1072. These latter have a similar appearance to the blades 1071 as before, that is to say they have peripheral support surface zones 1122 and inclined folds 1131. In this case, the outer periphery of each tongue 1072 is widened in the circumferential direction, while the outer periphery of each blade 1071 is outwardly curved, so that the slots, 424, which separate the blades 1071 from the tongues 1072 have a sinuous shape.

It will be noted that in FIGS. 29 to 31, the tongues offer at least one additional support zone for the purpose of stabilization. Thus, as the friction liners 131 and 132 become compressed, each respective zone or zones 932, 822 or 1122 is arranged to make contact with the liner 132 so as to offer a reaction surface to the latter. These zones thus constitute stabilization zones which here extend in the same plane as the central zone 722, by virtue of the folds 931, 821 and 1131.

In a modification, these zones may be slightly withdrawn with respect to the central zones. Thus the friction liner 131 remains substantially flat. In this way, a liner support disc is obtained which has at its outer periphery a large surface area of support zone, which reduces embedding and judder effects because the friction liners 131 and 132 remain in a substantially parallel plane. The liner support disc, and therefore the clutch friction wheel, are accordingly able to rotate at high speed, while following the gradual deformation of the pressure plate and reaction plate into a conical form. In addition, distribution of wear in the friction liners is improved still further.

It will be appreciated that the folds 724, 924, 1024, 931, 921, 821, 1131 and 1021 give good stability to the liner support disc, which enables good contact to be made between the friction liners and the pressure and reaction plates. This in turn reduces wear in the liners.

It will also be appreciated that the good equilibrium of the clutch friction wheel, and the good flatness of its friction liners, are due especially to the regular spacing of the fastening holes 19, and to their position on the axis of symmetry of the tongues and of the tripod blades.

Here, in the clutch engaged position, i.e. with the friction liners 131, 132 being gripped, there is a space between the two friction liners 131 and 132 such that the blades 771, 971 or 1071 are not totally flattened. As in the previous examples, this enables the friction liners to adapt to the shape of the pressure plate and reaction plate. The longitudinal folds 724, 924 and 1024 need not constitute the foot elements of the blades by themselves. Instead, again as mentioned in connection with previous embodiments, each fold may be joined to the central portion of the disc through a further foot portion.

A band of a suitable adhesive may be added, with this band extending radially from one fixing hole 19 to another, so as to improve the security of fixing of the friction liners.

Where the radial size of the lugs and blades permits, it is possible to add at least one further fixing hole 19, so as to add an additional fastener.

Some of the blades and/or tongues may of course not have an additional fastening hole 19, and these can then be without the extensions such as the extensions 725, 925 and 1025.

All possible combinations of features in the embodiments described may of course be adopted. For example, in FIG. 29 the tongues 772 may have only one fixing hole 19, arranged centrally in the tongue.

Figure 32:
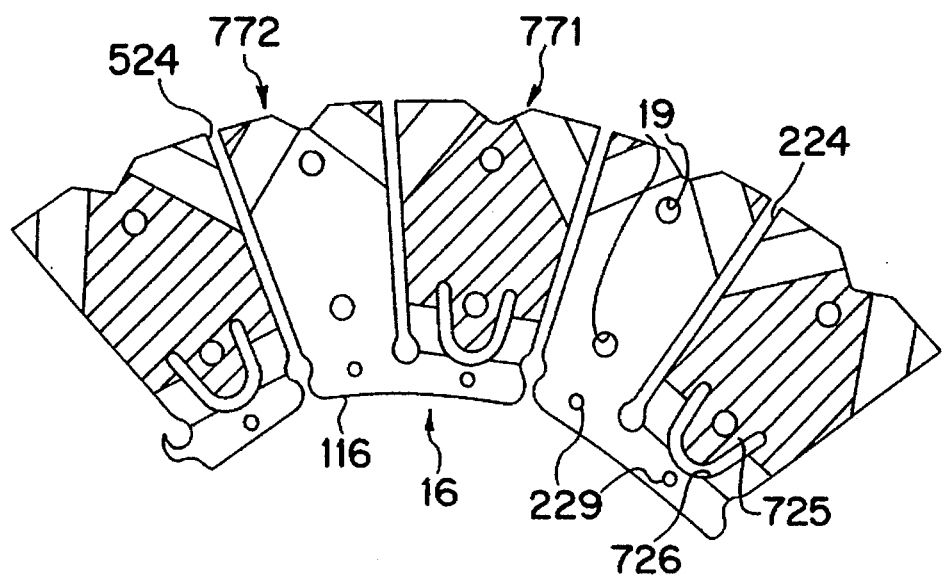
FIG. 32 is yet another view similar to FIG. 29, but shows a third modified version of the disc seen in FIG. 29.

Reference is now made to FIG. 32 showing another modification. In FIG. 32 the central portion 16 of the liner support disc is divided into bands 116. Each band 116 carries a tripod blade 771 and a blade in the form of a tongue 772 similar to those carrying the same reference numerals in FIG. 29. Each blade 771 is integral with the associated band 116, the latter being in the form of an annular sector. This band 116 joins one blade 771 to a tongue 772, and is formed with two holes 229 for securing it to the damper plate 4, in this example by riveting.

Figure 33:
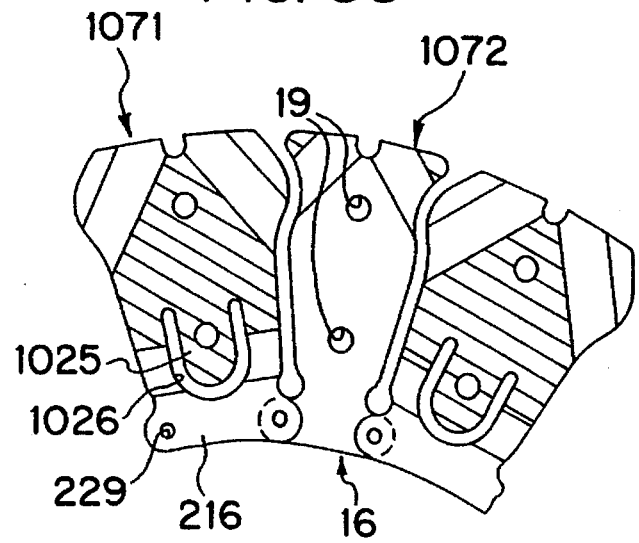
FIG. 33, again, shows a fourth modified version of the liner support disc of FIG. 29.

Referring now to FIG. 33 with yet another modification, the central portion 16 is here divided into bands 226, formed with ears at each of their circumferential ends. The ears are formed with holes 229, and overlap from a tongue 1072 to a consecutive tripod blade 1071. The bands 226 are secured to the damper plate 4 by riveting through the holes 229.

In FIGS. 32 and 33, it is the damper plate 4 that joins the bands 116 or 226 together. The central portion of the clutch support disc thus consists here of two parts, namely the bands 116 or 226, and the damper plate 4, respectively.

Reverting to FIGS. 15 to 20, it is of course possible to provide additional holes in the lugs 226 (FIG. 15) which flank the longitudinal folds 280, 281 between them. In that case, it is possible to provide three fastening holes, each arranged at the apex of a triangle, for the tripod blades 271, 272, namely the hole 19 in the axis of symmetry and two additional holes for the two lugs 226, there being one hole to each lug. Fastening of the friction liners is thus better by virtue of the three holes.

The chamfered friction pads of FIG. 12 can of course be fixed on the support crowns 40 of FIG. 9, in the manner shown in FIGS. 34 to 38, to which reference is now made. The blades here are not adapted to transmit a driving torque, by contrast with the other embodiments shown in FIGS. 1 to 33. Thus, in FIGS. 34 to 38, the only function of the blades is to provide the necessary axial progression for the gripping of the friction liners between the reaction and pressure plates. However, these blades do offer the same advantages as in the arrangements described with reference to the preceding Figures, especially as regards the increase in contact surfaces, reduction in the incidence of embedding, judder, and wear of the friction liners.

Figure 35:
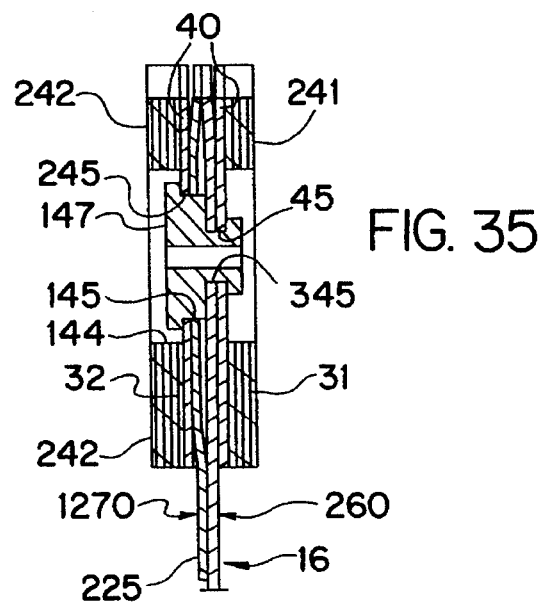
FIG. 35 is a scrap view in cross section taken on the line 35—35 in FIG. 34.

In these FIGS. 34 to 38, the liner support disc has a central portion 16 which carries, integrally at its outer periphery, a set of support tongues or radial support blades 260 in the same plane as the central portion 16 (see FIG. 35). These tongues 260 have at their outer periphery a portion which is inclined towards the friction liner 32, again as can be seen in FIG. 35. The tongues 260 are abutted on the support crown 40 of the friction liner 31, this being the liner that cooperates with the reaction plate of the clutch.

The crown 40, having apertures 43, is secured to these tongues 260 by means of rivets 147. These rivets are of stepped form, and consist of shanks which constitute support pins. Each rivet shank has a portion of increased diameter for the mounting of the support crown 40 of the friction liner 32. This shank portion of increased diameter is shouldered, and serves as an abutment for the support crown 40 of the liner 32, while the deformed foot of the shank of the rivet 147 acts as an abutment for the other crown 40, i.e. that of the liner 31.

Friction pads 241 and 242, similar to those in FIG. 12, are fitted on the crowns 40 so as to constitute with the latter the friction liners 31 and 32. As in the previous examples, these are supple and flexible, and have a reduced inertia due to the apertures 43.

Holes 144, 45, 145, 245 and 345 (which are located centrally in this example) are provided for accommodation of the shanks of the rivets 147. More precisely, the holes 245 formed in the support crown 40 of the friction liner 32 are of greater diameter than the holes 45 in the other support crown 40, i.e. that of the liner 31.

Figure 36:
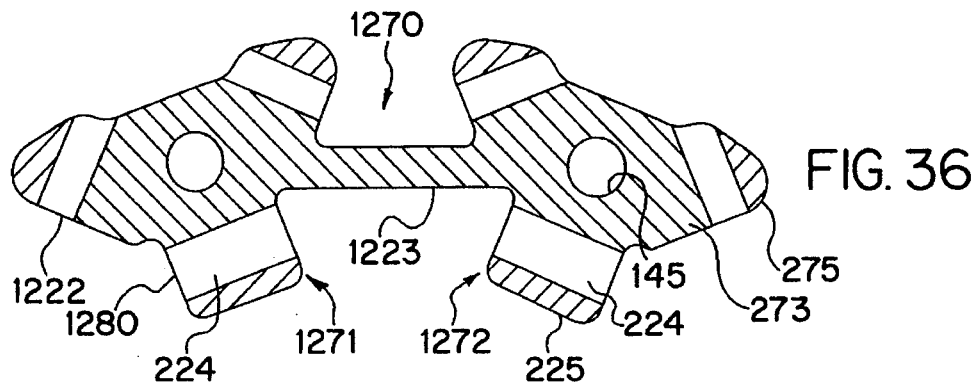
FIG. 36 is a view in cross section showing the double blade member which is part of the arrangement seen in FIG. 34.
Figure 37:
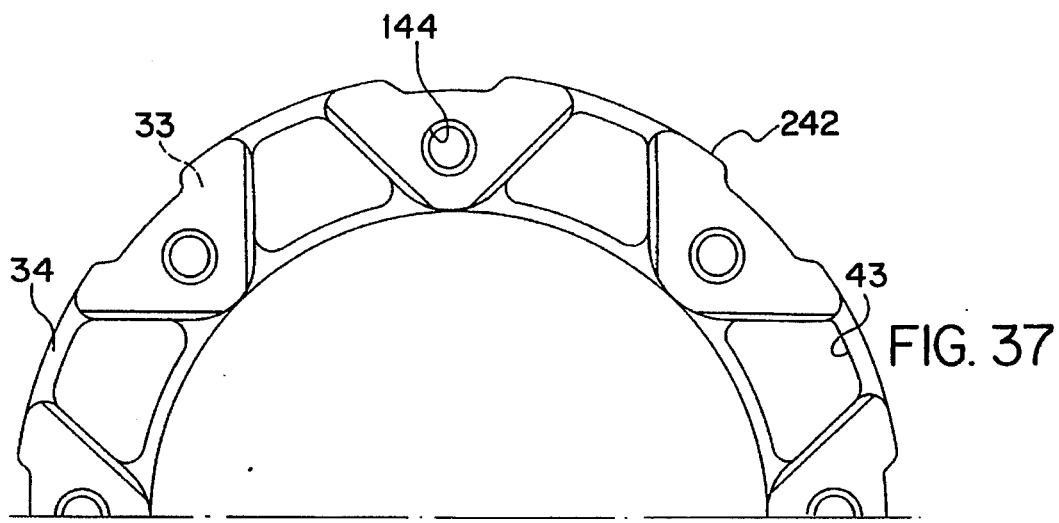
FIGS. 37 and 38 are half views showing, respectively, the two friction liners.
Figure 38:
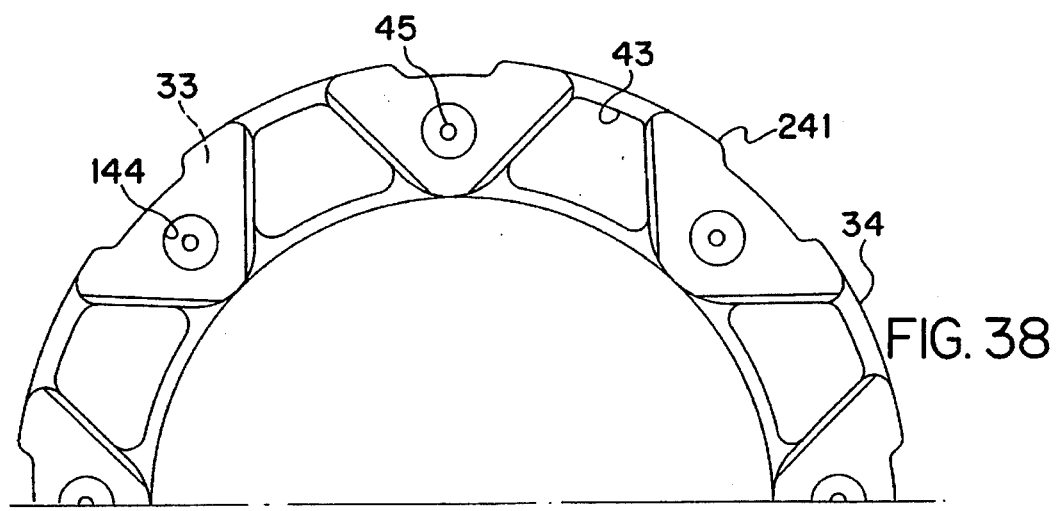

Double blade members 1270, shown in FIG. 36, are interposed axially, as shown in FIG. 35, between the support tongues 260 and the crown 40 of the liner 32. These double blade members 1270 have a thickness which is smaller than that of the tongues or blades 260, and are thus more flexible. Each double blade member 1270 comprises two blades 1271 and 1272, which are joined together circumferentially by an integral strip 1223 that prevents the blades 1271 and 1272 from rotating. These blades are generally the same as the blades 171 and 172 in FIG. 14.

Thus the blades 1271 and 1272 are again of the tripod type and in the form of a cat's head, with each blade including a central support surface zone 273 offering a large surface area, together with two peripheral support surface zones 275 which are offset axially from the corresponding zones 273. In each blade, the central zone 273, which becomes narrower towards the outer periphery of the tongues 260 and of the central portion 16, is joined to the peripheral zones 275, which here have the form of ears, through folds 1222 which are oblique with respect to the radial axis of symmetry of the blade, and which are directed axially all in the same direction. The zones 275 are arranged to make contact with the blades 260 of the liner support disc. The central zones 273 are joined, through tangential folds 224 on either side of the radial axis of symmetry of the blade, to two foot portions 225 which make abutting contact with the central portion 16 of the liner support disc, as can be seen in FIG. 35.

The support pins or rivet shanks 147 pass through the friction pads 241 and 242 via central apertures 144 which are formed in the latter. The rivet shanks pass through the centres of the central zones 273 via a hole 145 formed in each of the latter, and through the tongues or blades 260 via respective holes 345. The head of each rivet bears against the support crown 40 of the friction liner 32. The holes 144 formed in the pads 241 and 242 are of course larger than those in FIGS. 9 and 12.

The holes 144, 45, 145, 245 and 345 axially register with each other. The holes 345 and 45 are of the same diameter as each other, and the holes 245 and 145 have the same diameter as each other. Thus, the foot of each rivet 147 secures the relevant crown 40 to the blades 260, while the other crown 40 and the double blade members 1270 slide axially on the portions of the rivet shanks having the increased diameter, being thus connected to the blades 260 and to the central portion 16 via the rivet shanks.

Accordingly, the support tongues 260 carry the friction liners 31 and 32, and carry the double tripod blade members 1270 via the shanks 147, with the liner 31 being secured axially with respect to the shanks 147; while the other liner 32 and the double blade members 1270 are free to be displaced axially along the rivet shanks 147. In this way the liner 32 transmits the driving torque, while the double blades have an axial elasticity function. In this example, the double blade members 1270 are of metal.

A radial clearance is provided between the apertures 245, 345 and the heads of the rivets 147, so that the friction liner 32 is able to deform in response to the deformation of the pressure plate in the same way as has been explained above.

The maximum axial spacing between the two support crowns 40 is determined by the rivet shanks 147, that is to say by the distance separating the foot of each rivet shank from the shoulders defined on its head.

The central portion 16 of the liner support disc thus carries the tripod blades 1271 and 1272 via the radial tongues or blades 260, the blades 1271, 1272 being joined to the central portion 16 through the foot elements, one to each blade. Each of these foot elements consists of the corresponding fold 224 and the foot portion or terminal tongue 225 which is arranged to make contact with the central portion 16 and to be secured to the latter. Each foot element 224, 225 thus has the form of a generally triangular tongue, and extends radially inwardly, with the blades 1272 and 1271 being oriented radially as shown in FIG. 36. The friction pads 241 and 242 are of course identical to each other.

Because of the set of double blade elements 1270, the friction liner 32 is able easily to accommodate the conical deformation of the pressure plate. In addition, the blades 1271 and 1272 are prevented from pivoting by the strip of material 1223 which joins them together. The strip 1223 is flexible and is oriented tangentially as shown, to join the two central zones 273 together. Each end of the strip 1223 joins the corresponding zone 273 radially inwardly of the oblique folds 1222, and also radially inwardly of the pitch circle of the holes 145. This is clearly shown in FIG. 36.

The liner support disc is thus able to rotate at very high speeds without any danger of rupture, the thickness of the double blade member 1270 being chosen according to the required elasticity, since it does not transmit any torque.

It is of course possible in FIGS. 19 and 20 to add an additional fold to the end of the zone 422B in FIG. 19. This additional fold delimits an additional terminal support surface zone as is indicated in broken lines in FIG. 19. These terminal support surface zone are offset axially with respect to the support surface zones 422B, towards the central zone 321A. Thus an additional support surface zone is obtained.

As will have been understood from the foregoing description and from the drawings, each tripod blade preferably has a central zone of symmetrical form, so as to give the blade good mechanical strength. When the friction liners are compressed, the peripheral support surface zones, due to the deployment of the oblique folds, tend to move closer together to the central zone of the blade, and thus tend to come into contact with the friction liner associated with the central zone. This is how a natural progressive action is obtained during engagement of the clutch.

Finally, the blades are preferably symmetrical.

What is claimed is:

1. A liner support disc for a clutch friction wheel, the support disc comprising:

a central portion defining a radially oriented midplane;

a peripheral portion divided into a plurality of radially extending blades having a foot element connecting each of said blades to said central portion;

a plurality of friction liners supported on said blades; and fastening means for securing each of said friction liners to at least some of said blades, each of said blades having at least one support surface zone generally parallel to said midplane of said central portion of the support disc;

at least some of said blades are tripod blades, each said tripod blade having a central support surface zone and two peripheral support surface zones disposed on either side of said central support surface zone, said central support surface zone is offset axially with respect to said peripheral support surface zones and offset axially with respect to said central portion of the support disc;

each tripod blade having a radially oriented axis of symmetry, a tangential first fold connecting said central support surface zone of said tripod blade to said central portion of the support disc; and two second folds each joining said central support surface zone of said tripod blade to a respective said peripheral support surface zone thereof, each said second fold is oriented obliquely with respect to said radially oriented axis of symmetry.

2. A line support disc according to claim 1, wherein said central support surface zone of each said tripod blade comprises a radially inner portion and a radially outer portion, said radially outer portion is narrower in the circumferential direction than said radially inner portion.

3. A liner support disc according to claim 2, wherein each tripod blade has an outer periphery defining a central recess therein.

4. A liner support disc according to claim 1, wherein, in said at least some of said tripod blades, said central support surface zone has an external peripheral tongue.

5. A liner support disc according to claim 1, wherein, in each tripod blade, said central support surface zone has a pointed end.

6. A liner support disc according to claim 1, wherein, in each tripod blade, said central support surface zone has an inner periphery defining two lugs flanking a corresponding first fold.

7. A liner support disc according to claim 1, wherein said tripod blades are divided into two sets of blades, and wherein, in each said set, said peripheral zones are coplanar with said central support surface zones.

8. A liner support disc according to claim 7, wherein the length of said first folds in one set of said tripod blades is different from the length of said first folds in the other set of tripod blades.

9. A liner support disc according to claim 7, wherein size of said second folds in one said set of said tripod blades is different from the size in the other set of tripod blades.

10. A liner support disc according to claim 1, further including a series of radial tongues coplanar with said central portion of the support disc, with said tongues being disposed alternately with said tripod blades in the circumferential direction.

11. A liner support disc according to claim 10, wherein at least one said peripheral zone of each tripod blade at least partly envelops an adjacent said radial tongue.

12. A liner support disc according to claim 11, wherein each said tongue has a rounded free end.

13. A liner support disc according to claim 10, wherein at least some of the said radial tongues has at its free end a supplementary support surface zone and a junction fold joining said supplementary zone to the remainder of the tongue, the said junction fold being so oriented as to offset said supplementary zone axially towards said central zone of the adjacent tripod blades.

14. A liner support disc according to claim 13, wherein each said radial·tongue defines a free end of reduced circumferential width.

15. A liner support disc according to claim 13, wherein each said tongue has a slender profile towards its outer periphery and defines a root zone joining the tongue to said central portion of the support disc, whereby size of said root zone is increased.

16. A liner support disc according to claim 15, wherein said tripod blades and radial tongues define slots, each separating said tripod blades from an adjacent said tongue.

17. A liner support disc according to claim 13, wherein the said supplementary zone of each said tongue defines a radial height smaller than a radial height of said peripheral zones of the adjacent tripod blades, and smaller than a radial height of said junction fold.

18. A liner support disc according to claim 1, wherein said central zone of each tripod blade has at least one first through hole, with each of at least some of the tripod blades being formed with a slit across said first fold to define a central radially inward extension of said central support surface zone, said extension being formed with a second through hole, said fastening means comprising first fasteners received in said first through holes and second fasteners received in said second through holes.

19. A liner support disc according to claim 18, wherein each said extension comprises a lug extending generally radially.

20. A liner support disc according to claim 18, wherein each said slit extends locally into said central support surface zone of the corresponding blade.

21. A liner support disc according to claim 20, wherein each said slit is generally in the shape of a letter V with a rounded base, with the apex of the V being directed towards the axis of the central portion of the support disc.

22. A liner support disc according to claim 21, wherein each said extension is U-shaped and defines a root zone of reduced width joining it to said central support surface zone of the corresponding blade.

23. A liner support disc according to claim 18, wherein each said tripod blade having said slit defines a radial axis of symmetry of the slit coincident with the radial axis of symmetry of the tripod blade.

24. A liner support disc according to claim 18, further including a plurality of tongues generally similar to said tripod blades and alternating with said tripod blades in the circumferential direction, each said tongue having a central support surface zone coplanar with the central portion of the support disc, together with two peripheral support surface zones disposed on either side of said central support surface zone of the tongue.

25. A liner support disc according to claim 18, further including a plurality of tongues alternating with the tripod blades in the circumferential direction, with each said tongue having a support surface zone at its free end, together with a junction fold, the junction fold joining said support surface zone to the remainder of the tongue and offsetting the support surface zone axially towards said central support surface zones of the adjacent tripod blades.

26. A liner support disc according to claim 1, including a plurality of double blade members, each comprising a pair of said tripod blades and an integral strip joining together the blades of said pair so as to prevent rotation of the tripod blades.

27. A liner support disc according to claim 26, further including a plurality of radial support tongues joined to said central portion of the support disc, and a plurality of support pins carried by said support tongues, with said double blade members being mounted for axial sliding movement on said support pins.

28. A liner support disc according to claim 27, wherein, in each said double blade member, said central support surface zone of each tripod blade is formed with a through hole for receiving said support pin and defining a radial clearance around said support pin.

29. A liner support disc for a clutch friction wheel, the support disc comprising:

a central portion defining a radially oriented midplane;

a peripheral portion divided into a plurality of radially extending blades having a foot element connecting each of said blades to said central portion;

two friction liners arranged on either side of said peripheral portion of the support disc, each of said friction liners comprises an endless support crown consisting of a plurality of first sections and a plurality of second sections disposed alternately with said first sections, each of said second sections having at least one aperture therethrough, each of said friction liners further comprising a plurality of friction pads secured to said first sections, each friction pad having a triangular shape defining a radially inward directed apex; and fastening means for securing each of said friction liners to at least some of said blades, each of said blades having at least one support surface zone generally parallel to said midplane of said central portion of the support disc;

at least some of said blades are tripod blades, each said tripod blade having a central support surface zone and two peripheral support surface zones disposed on either side of said central support surface zone, said central support surface zone is offset axially with respect to said peripheral support surface zones and offset axially with respect to said central portion of the support disc;

each tripod blade having a radially oriented axis of symmetry; a tangential first fold connecting said central support surface zone of said tripod blade to said central portion of the support disc; and two second folds each joining said central support surface zone of said tripod blade to a respective said peripheral support surface zone thereof, each said second fold is oriented obliquely with respect to said radially oriented axis of symmetry.

* * * * *